G. S. TIFFANY.
TELAUTOGRAPH.
APPLICATION FILED FEB. 5, 1906.

954,150.

Patented Apr. 5, 1910.
13 SHEETS—SHEET 1.

G. S. TIFFANY.
TELAUTOGRAPH.
APPLICATION FILED FEB. 5, 1908.

954,150.

Patented Apr. 5, 1910.
13 SHEETS—SHEET 4.

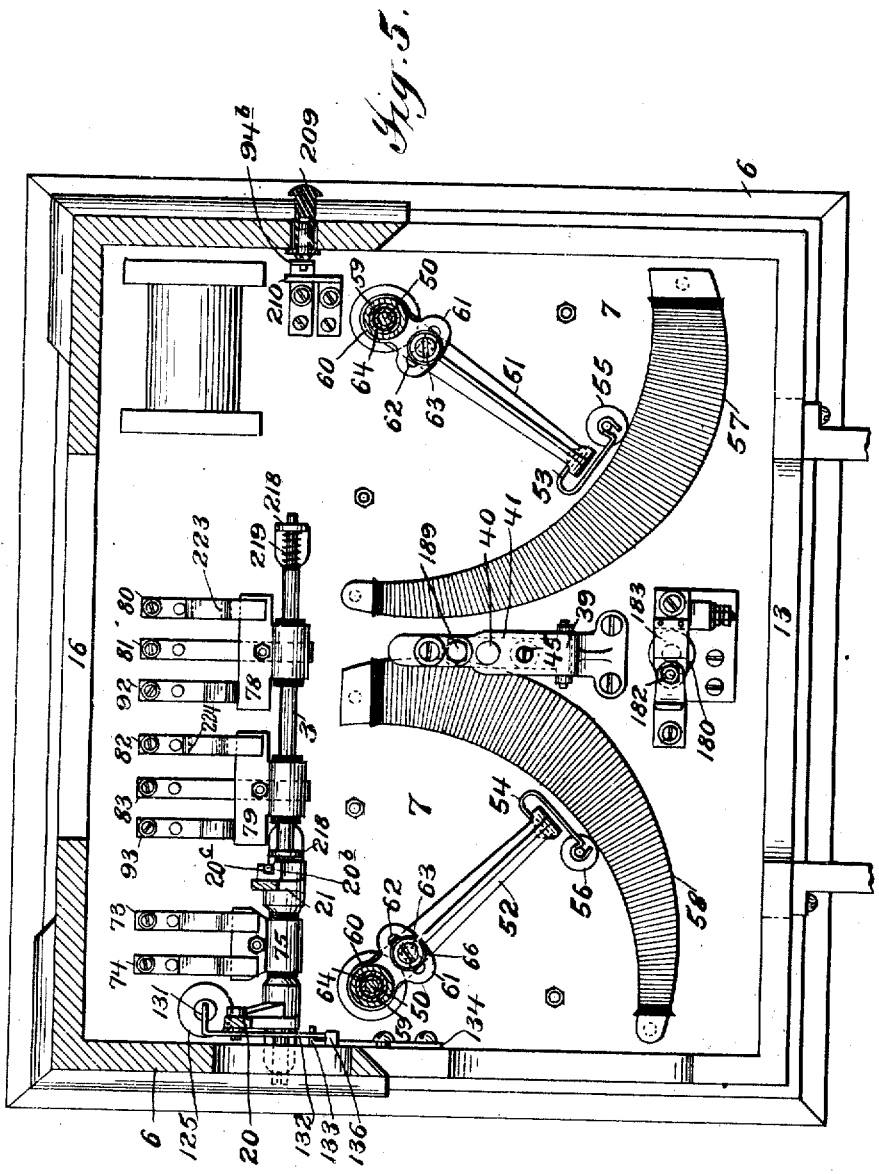

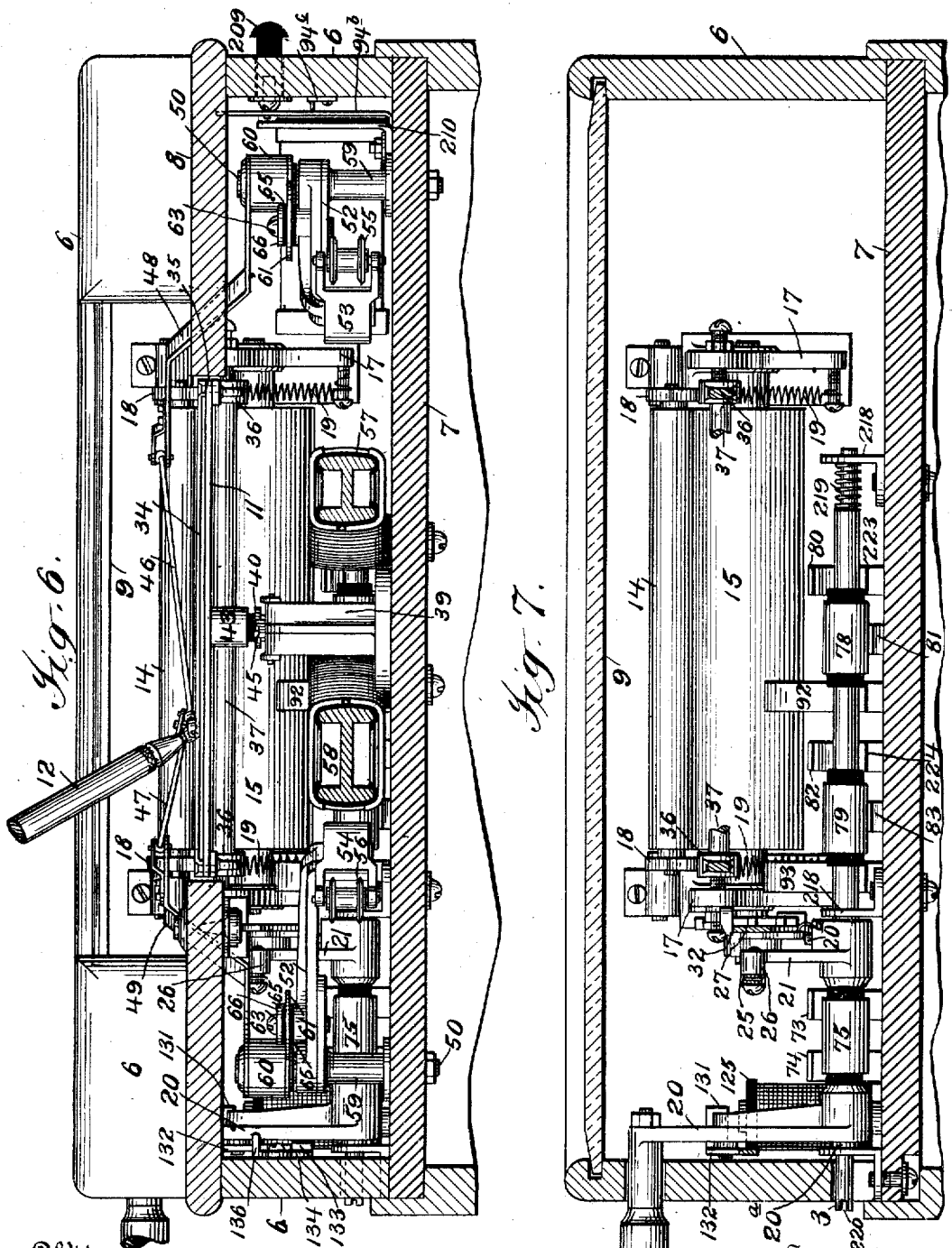

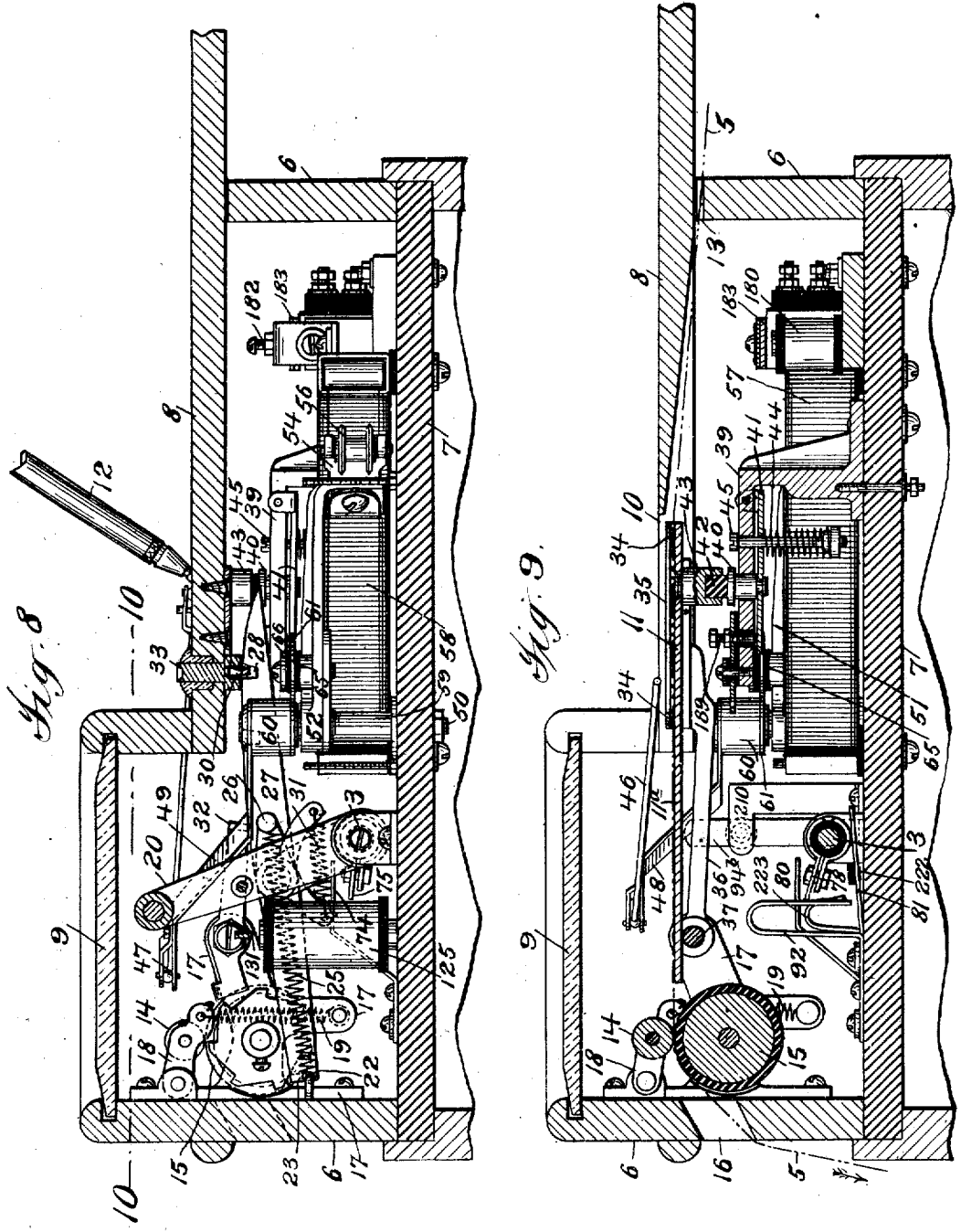

G. S. TIFFANY.
TELAUTOGRAPH.
APPLICATION FILED FEB. 5, 1906.
954,150.
Patented Apr. 5, 1910.
13 SHEETS—SHEET 3.
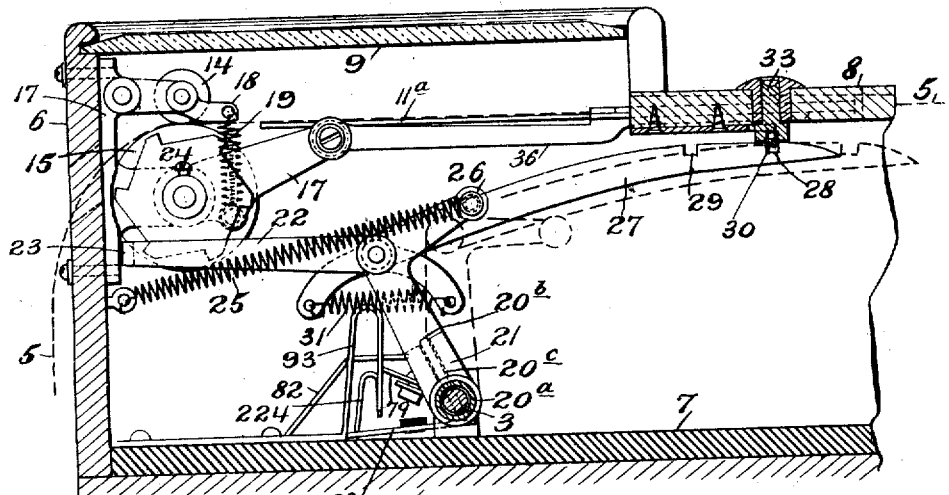
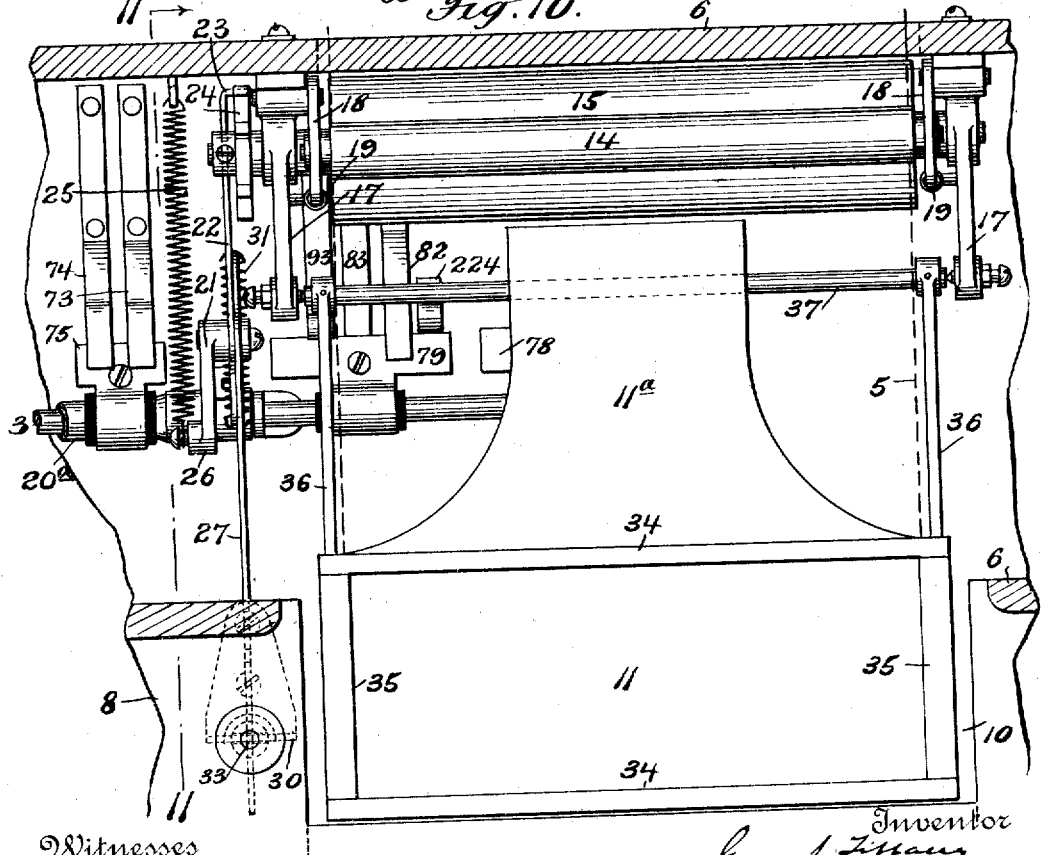

G. S. TIFFANY.
TELAUTOGRAPH.
APPLICATION FILED FEB. 5, 1906.
954,150.
Patented Apr. 5, 1910.
13 SHEETS—SHEET 9.
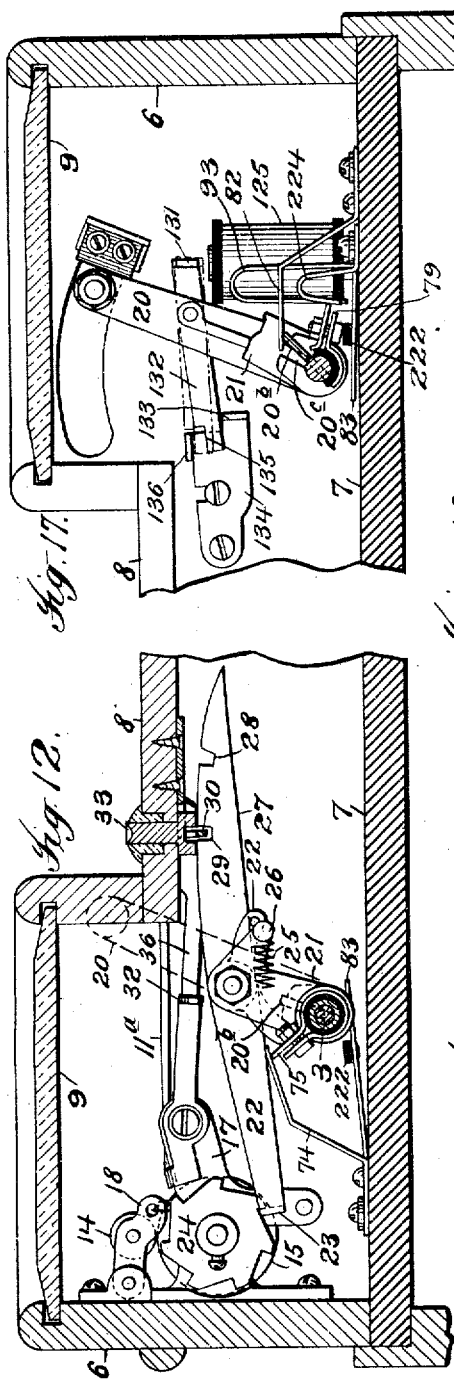
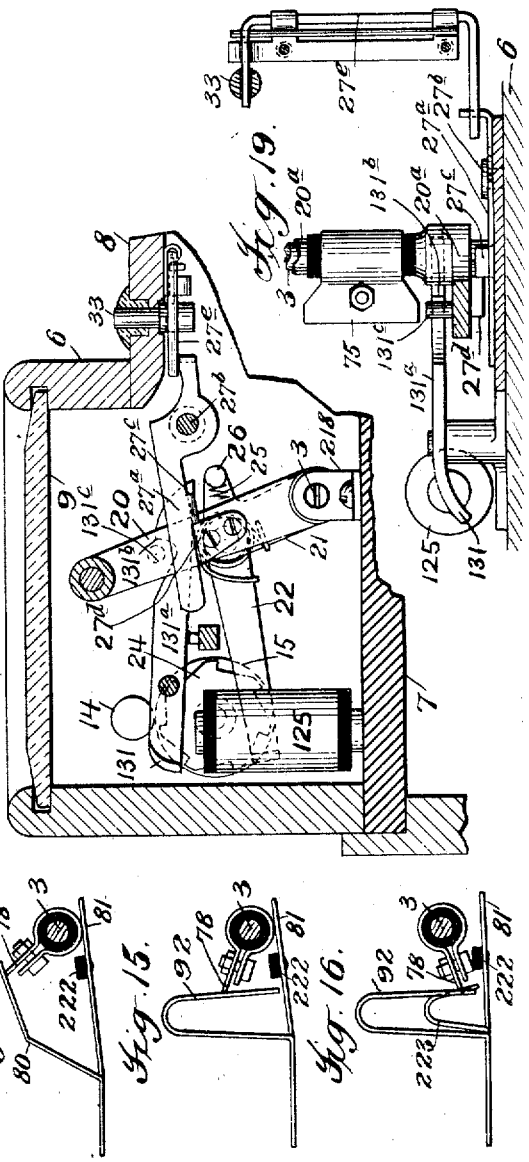
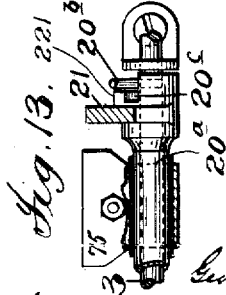
Witnesses
Inventor
George S. Tiffany
By his Attorneys

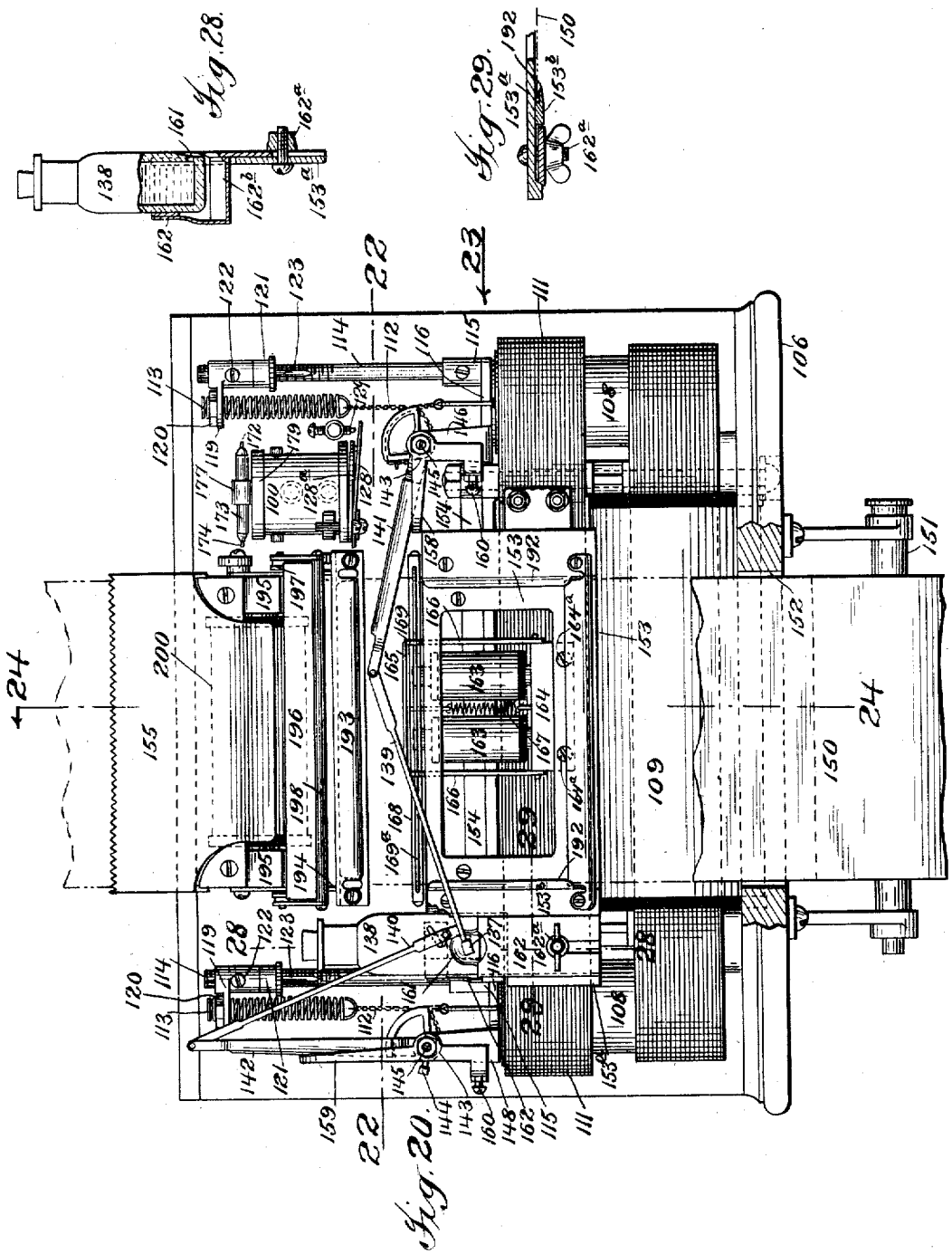

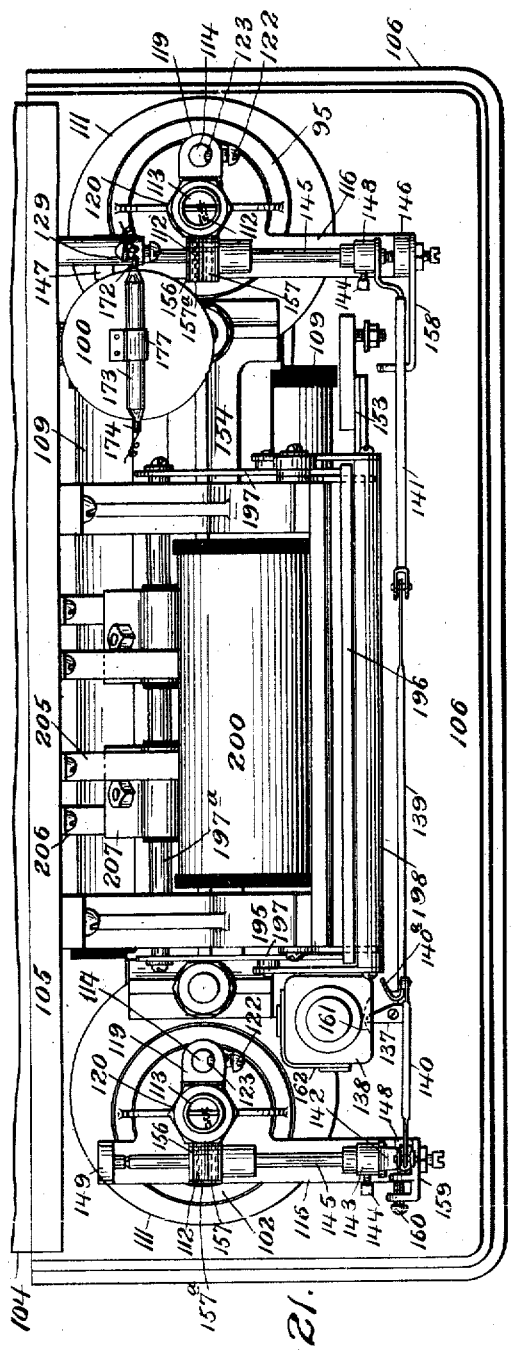
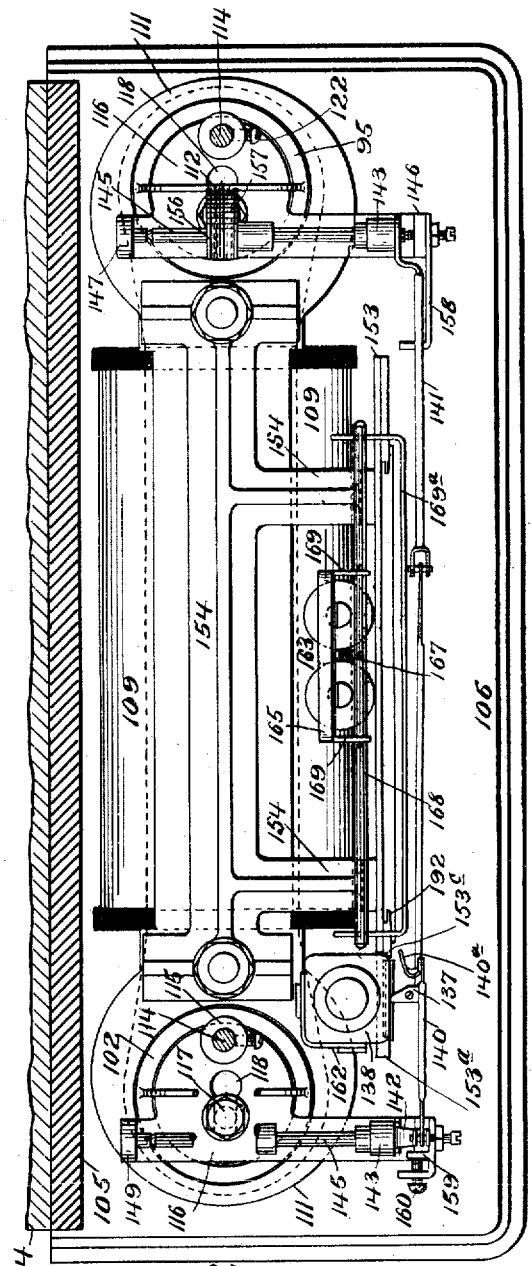

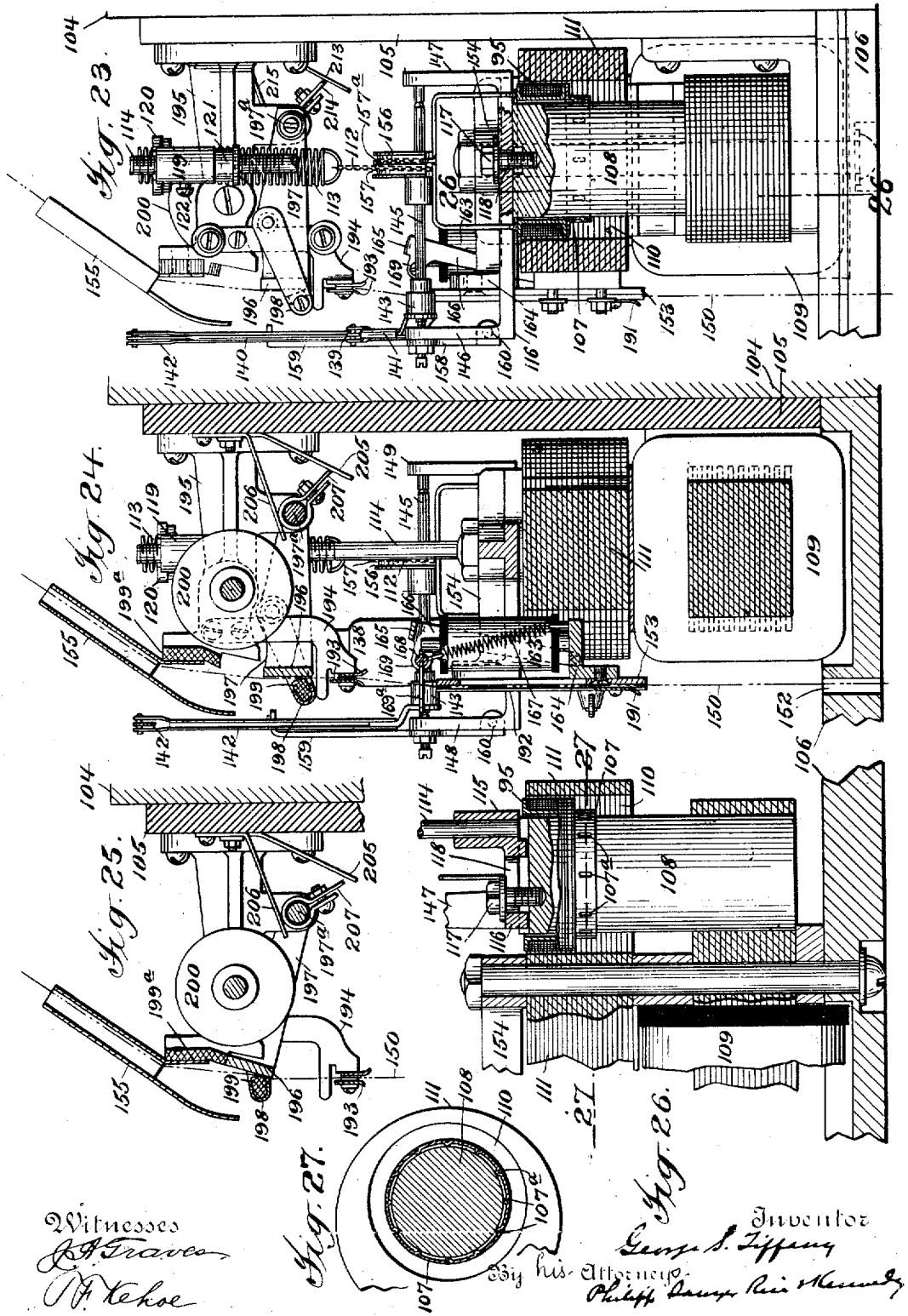

G. S. TIFFANY.
TELAUTOGRAPH.
APPLICATION FILED FEB. 5, 1906.
954,150.
Patented Apr. 5, 1910.
13 SHEETS—SHEET 13.
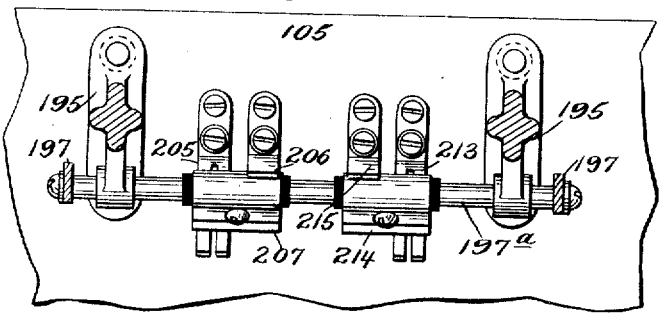
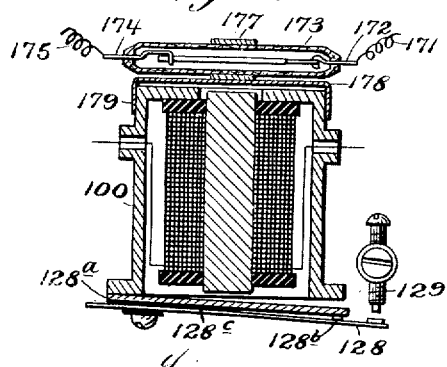
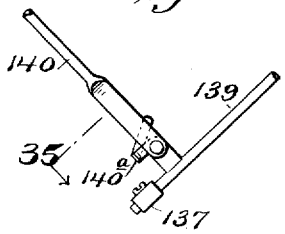
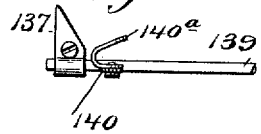
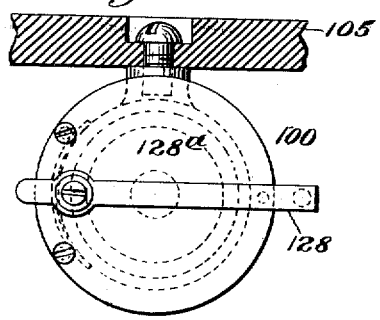
Witnesses
J. A. Traves
O. F. Kehoe
Inventor
George S. Tiffany
By his Attorneys
Philipp Sawyer Rice & Kennedy

UNITED STATES PATENT OFFICE.

GEORGE S. TIFFANY, OF SUMMIT, NEW JERSEY, ASSIGNOR TO THE GRAY NATIONAL TELAUTOGRAPH COMPANY, OF NEW YORK, N. Y., A CORPORATION OF VIRGINIA.

TELAUTOGRAPH.

954,150.  Specification of Letters Patent.  Patented Apr. 5, 1910.

Application filed February 5, 1906. Serial No. 299,413.

*To all whom it may concern:*

Be it known that I, GEORGE S. TIFFANY, a citizen of the United States, residing at Summit, county of Union, and State of New Jersey, have invented certain new and useful Improvements in Telautographs, fully described and represented in the following specification and the accompanying drawings, forming a part of the same.

This invention relates to improvements mainly in telautographic apparatus of the kind shown and described in Letters Patent of the United States Nos. 668,889, 668,890, and 668,895, granted to me February 26, 1901, that is to say, telautographic apparatus in which the movements of the receiving pen in unison with the transmitting tracer are effected by variations in the strength of the currents sent to line from the transmitting instrument to the receiving instrument, such variations in current strength being in turn effected by and corresponding to the movements of the transmitting tracer.

In the accompanying drawings is illustrated telautographic apparatus of this class, embodying the several features of the present invention.

Figure 1:
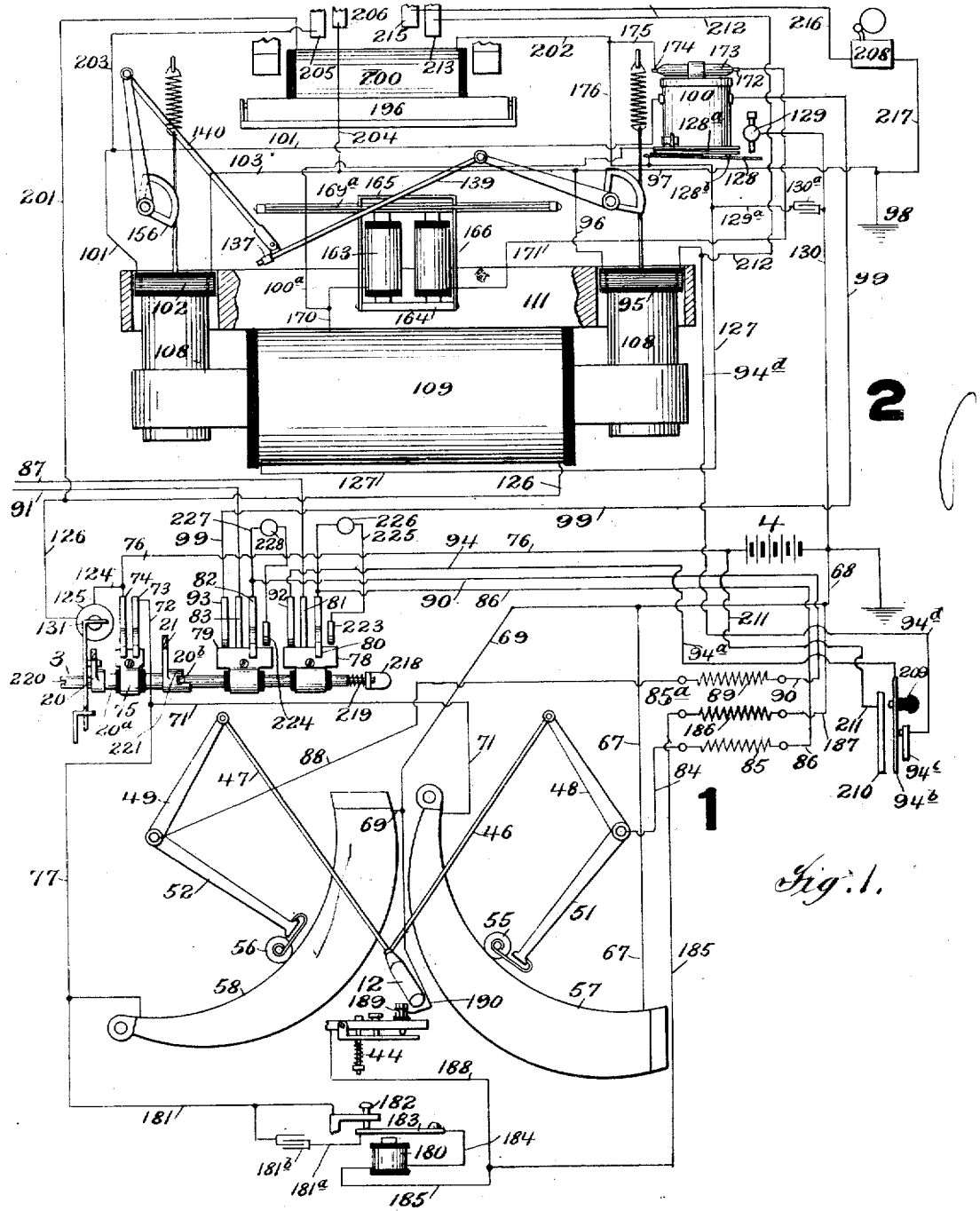
Figure 2:
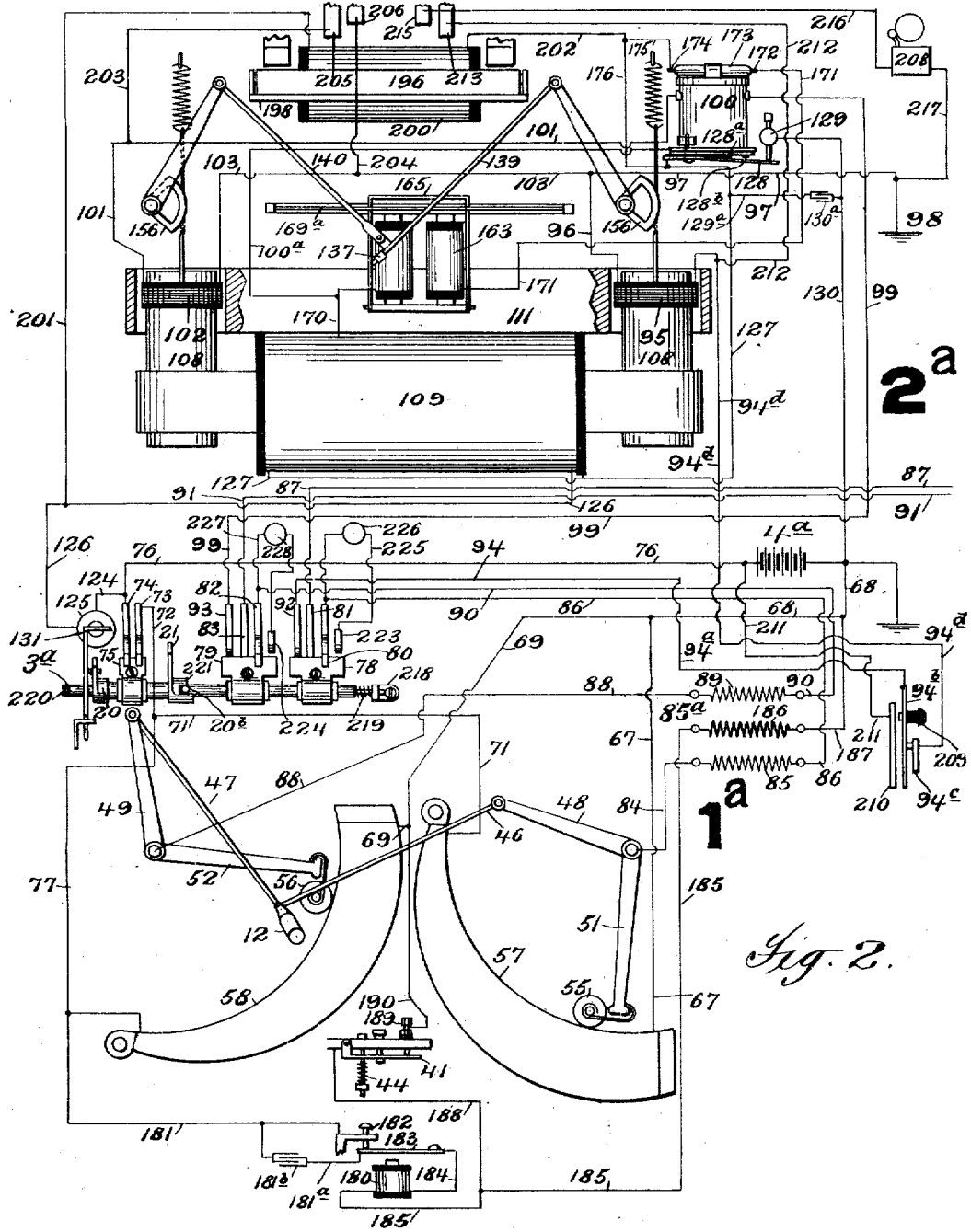
Figure 3:
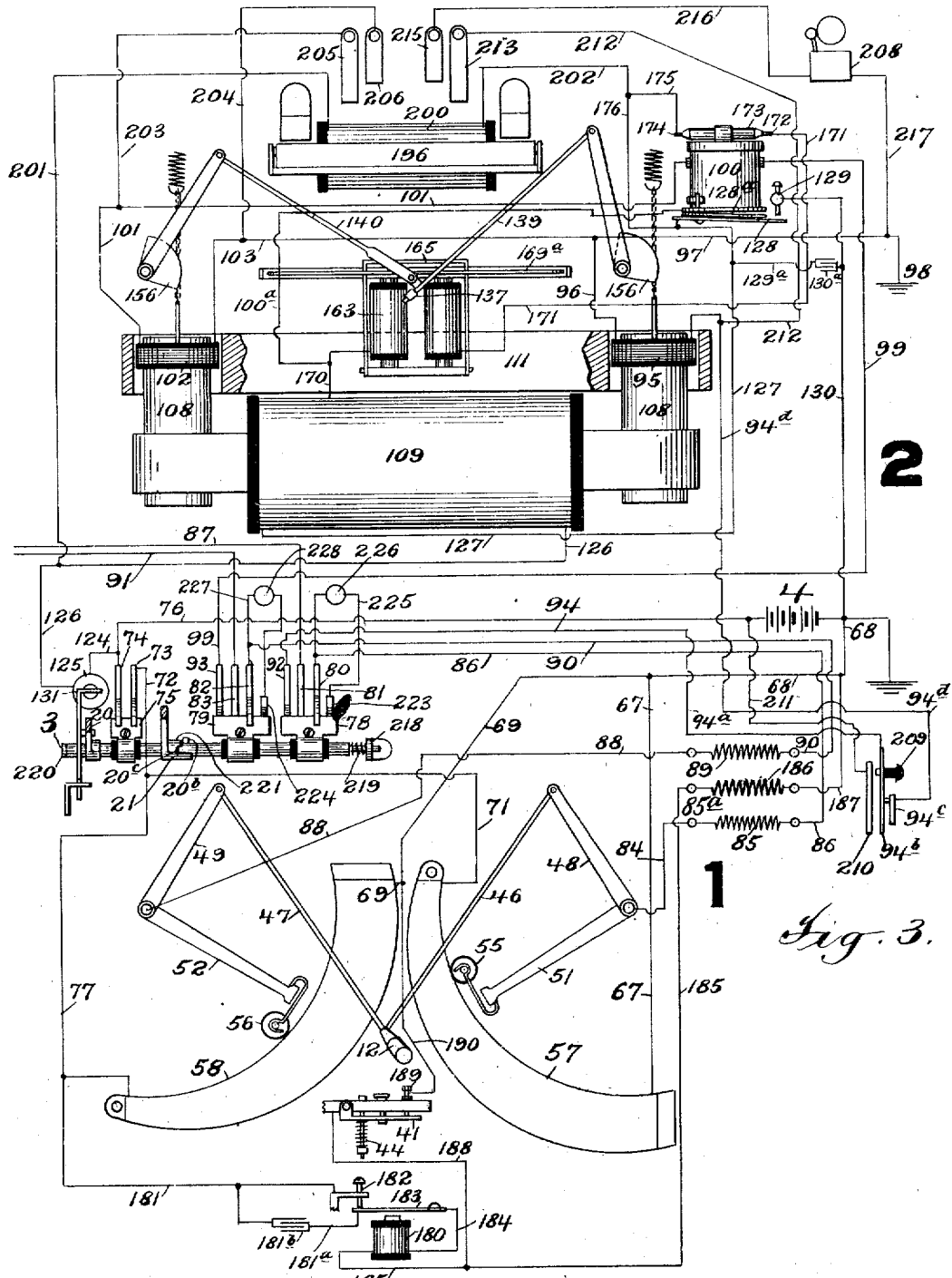
Figure 4:
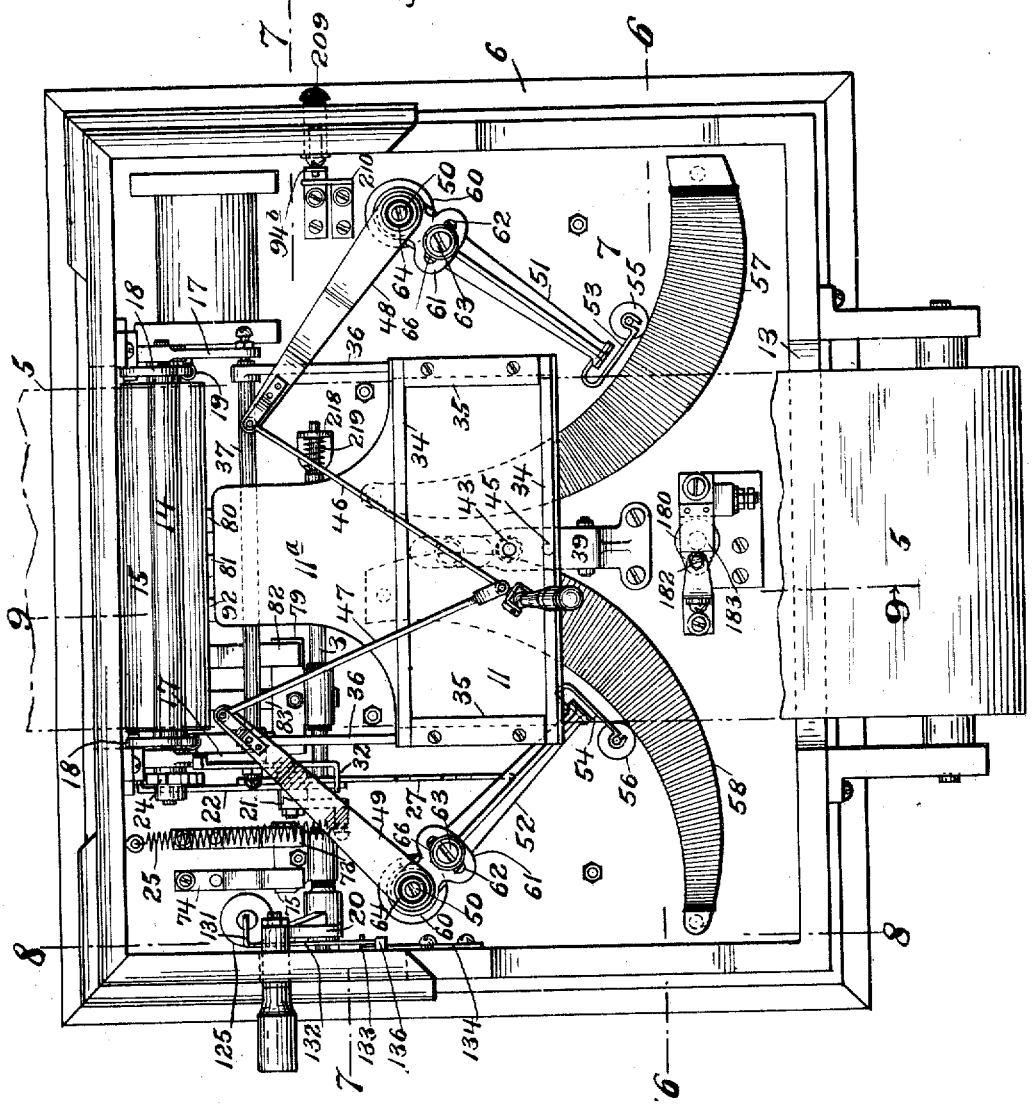

In said drawings—Figure 1 is a diagrammatic view of one station which may, for convenience of reference, be termed the "home" station, with the tracer of the transmitting instrument shown as operating to transmit a message and with the pen of the receiving instrument shown in its unison or normal position. Fig. 2 is a diagrammatic view of another station which may, for convenience, be termed the "distant" station, with the tracer of the transmitting instrument shown in its unison or normal position and with the pen of the receiving instrument shown as moved from its unison position and as operating to reproduce messages transmitted to it, for example, by the transmitting instrument of Fig. 1. Fig. 3 is another diagrammatic view of a station showing the transmitting and receiving instruments of the station as connected or in circuit with each other for the purpose of testing and adjustment. Fig. 4 is a plan view of the transmitting instrument, with the cover or top of its casing removed, the tracer thereof being shown in the position indicated in Fig. 1, that is, operating to transmit a message. Fig. 5 is a horizontal section of the transmitting instrument with the parts, so far as shown, in the same position as in Fig. 4. Figs. 6 and 7 are vertical sections on the lines 6, 7 of Fig. 4. Figs. 8 and 9 are vertical sections on the lines 8, 9, respectively, of Fig. 4. Fig. 10 is a section, on an enlarged scale, taken on the line 10 of Fig. 8. Fig. 11 is a vertical section on the line 11 of Fig. 10. Fig. 12 is a vertical section of a portion of the transmitting instrument illustrating particularly the paper shifting mechanism and also a portion of an oscillatory master switch for connecting the transmitter or receiver of the station with the receiver or transmitter, respectively, of another station, or so connecting the transmitter and receiver of its own station. Fig. 13 is a plan view, partly in section, of a portion of the master switch, just referred to; Figs. 14, 15 and 16 are transverse sections of the same master switch, illustrating it in the three different positions to which it may be rocked. Fig. 17 is a vertical section of the transmitting instrument, illustrating particularly a magnet and connections, controlled from the transmitter of a distant station, for locking the master switch in its normal position while messages are being transmitted from such distant transmitter; this view also illustrating the master switch in the position it occupies when the transmitter and receiver of its station are connected together for the testing and adjustment of their parts. Fig. 18 is a vertical section of a portion of the transmitter, illustrating a modification in this lock magnet and connections. Fig. 19 is a plan view of the same. Fig. 20 is a front elevation of the receiving instrument. Fig. 21 is a plan view, on an enlarged scale, of the same. Fig. 22 is a horizontal section of the same on line 22 of Fig. 20. Fig. 23 is an end view, partly in section, looking in the direction of the arrow 23 in Fig. 20. Fig. 24 is also a vertical section taken on the line 24 of Fig. 20. Fig. 25 is a similar view, of some of the parts, illustrating them in a different position. Fig. 26 is a vertical section on the line 26 of Fig. 23. Fig. 27 is a horizontal section on the line 27 of Fig. 26. Fig. 28 is a detail, partly in section, on the line 28 of Fig. 20, illustrating the bottle from which the receiving pen is supplied with ink, the holder therefor, and the manner in which said holder and bottle are secured in position in the receiving instrument. Fig. 29 is a section illustrating such securing means taken on the line 29 of Fig. 20. Fig. 30 is a front elevation, partly in section, of a switch mechanism at the receiver controlling certain branch circuits in the receiving instrument. Fig. 31 is a vertical section of a combination relay introduced into one of the main line circuits in the receiving instrument, and controlling the local circuits of the receiving instrument. Fig. 32 is a bottom plan view of the same, illustrating particularly its transmitter and a contact plate carried thereby for closing the local circuits referred to. Fig. 33 is a transverse section of the tube, and the contacts therein, arranged above the relay as shown in Fig. 31. Fig. 34 is an elevation of the receiving pen arms. Fig. 35 a sectional view of the same on the line 35 of Fig. 34; and Fig. 36 is an end view of the receiving pen.

Each station comprises a transmitting instrument (which, for convenience of reference in describing the operation of the system, is designated 1 in Fig. 1, and 1ª in Fig. 2), and a receiving instrument (designated 2 in Fig. 1, and 2ª in Fig. 2), as just indicated, and also an oscillatory master switch (designated 3 in Fig. 1, and 3ª in Fig. 2), for connecting its transmitter or receiver with the receiver or transmitter, respectively, of another station, or (as shown in Fig. 3) connecting together the receiver and transmitter of its own station, and a battery (designated 4 in Fig. 1, and 4ª in Fig. 2) from which, when the station is transmitting, currents, varying in strength in accordance with the movements of the transmitting tracer, are shunted into the main line circuits connecting the transmitting instrument with the receiving instrument to which it is transmitting; this battery also serving, when the station is receiving, as a local battery for the receiving instrument. Each transmitting instrument is provided with mechanically operated paper shifting means whereby fresh portions of the usual paper record strip 5 may be brought into position for writing, and each receiving instrument is also provided with paper shifting means, which, however, are electrically controlled and operated from the transmitting instrument with which it may be in circuit. All of these parts will be hereinafter fully described. As the apparatus at one station is identical, in construction and method of operation, with that at the other station or stations, only one transmitting instrument and one receiving instrument, together with the circuit connections and circuit controlling devices between stations and between the transmitting and receiving instruments of the same station, need be described.

The parts of the transmitting instrument, the details of which, including the paper shifting mechanism and the master switch of the station, are illustrated in detail in Figs. 4 to 13, are inclosed in a suitable casing 6 having a base 7 of insulating material on which most of the devices of the transmitting instrument, as well as the master switch 3, are supported, and a table or top 8 in rear of which the casing is slightly raised and covered by a plate 9 of glass (Figs 8-11) through which the writing upon that portion of the record strip 5 which has been shifted beyond the field of writing, may be inspected. The top or cover 8 is provided with an opening 10 (Fig. 9) in which is located a writing platen 11 on which the paper strip 5 is supported during the operation of tracing or writing the message to be transmitted, the writing instrument or tracer 12 being preferably in the form of a pencil. The paper strip 5, which may be supplied from any suitable source, as from a web on a roll journaled outside the casing 6 (Fig. 4), enters the box or casing 6 through a slit 13 in the front wall thereof, passes over the writing platen 11, thence between a pair of drawing rolls 14, 15, and finally issues from the casing through a slit 16 in the rear wall of the machine, (see Figs. 4, 5, 9) when it may be wound up or otherwise disposed of. Roll 15 is journaled in brackets 17 secured to the rear wall of casing 6, while roll 14 is journaled in vertically swinging bearings 18 pivoted in said brackets and provided with springs 19 secured at their lower ends to fixed parts of the brackets 17 or to base 7 and serving to hold roll 14 yieldingly in engagement with roll 15, which is preferably rubber covered (Figs. 8, 9).

The shifting or feeding of the paper strip 5 at the transmitting instrument is accomplished by a hand lever 20 provided with a sleeve 20ª mounted on and oscillating with master switch 3, which is suitably journaled in bearings on base 7, and an arm 21, integral with said sleeve 20ª and provided with a pivoted lever 22 having a pawl 23 on its rear end for engaging a ratchet 24 fast to the shaft of drawing roll 15, and, on each forward movement of lever 20, rotating said ratchet and roll a distance equal to the space between two teeth of the ratchet. When hand lever 20 is rocked forward by the operator (Figs. 8-12), master switch 3 is caused to oscillate with lever 20 and its sleeve 20ª by a pin 20ᵇ on switch 3 entering a radial slot 20ᶜ in the inner end of sleeve 20ª (see Fig. 5). The hand lever 20 is normally held in its rearmost position (Fig. 1) and the master switch therefore in what is also its normal position (hereinafter described) by a spring 25 fast to the rear wall of the casing 6 and to a projection 26 on the arm 21 fixed to sleeve 20ª, and the parts are also normally locked in this position by a lever 27 pivoted at its rear end in arm 21 and provided on its upper edge with two notches 28, 29 (see Figs. 11, 12) adapted to be engaged by a catch 30 on the under side of cover 8. The rear end of this lever 27 and the forward end of lever 22 are on diametrically opposite sides of their common pivotal connection with arm 21 and are connected by a spring 31 which holds the lever 22 yieldingly in engagement with ratchet 24 and the lever 27 yieldingly in engagement with catch 30, upward movement of said lever 27 in its fully retracted position being limited by an arm 32 fixed to one of the brackets 17 (Figs. 4, 8, 11, 12). When the hand lever 20 is in its rearmost or normal position, catch 30 is in engagement with notch 28 on said lever (see Fig. 11) but may be disengaged therefrom by the operator, when he desires to operate hand lever 20, by depressing a button 33 (Figs. 8, 11) mounted in cover 8 and provided in the under side of its head with a slot fitting over the catch 30. The shank of this button 33 rests in an opening in cover 8 and when engaged by the point of a pencil, or the tracer 12, the head of button 33 will be depressed until its lower face is flush with the lower edge of catch 30 and, as, during this downward movement, it depresses the lever 27 it follows that the notch 28 therein will be disengaged from said catch and the hand lever 20 and connected parts thus released so that they may be rocked forward by the operator (as shown by full lines in Fig. 12 and dotted lines Fig. 11). If the button 33 be held depressed, the hand lever 20 may be moved back and forth by the operator, as many times as he desires, the paper strip 5 being shifted a certain distance on each movement, equal to the distance to which the paper strip is shifted in the receiving instrument with which the transmitting instrument may be in circuit. If, however, the pressure on button 33 be released, it will be forced upwardly by lever 27, the notch 29 in which will then be engaged by catch 30 and the hand lever 20 with its connected parts be locked in their forward positions, (as shown in Fig. 12) for a purpose hereinafter described.

The writing platen 11 is provided at its front and rear edges with paper guiding strips 34, under which the paper strip 5 passes and which serve to hold said strip against the surface of the writing platen, and is also provided with side guides 35 extending over the edges of the paper strip 5 and serving to prevent lateral displacement thereof (see Figs. 4, 9, and 10); the writing platen 11 being also provided with a rearwardly extending portion 11ª serving to bridge the space between it and the drawing rolls 14, 15, and thus support the strip on its way to the latter (see Figs. 4, 8–11).

The writing platen 11 is also provided at opposite sides with rearwardly extending arms 36 (see Figs. 4, 9–12) rigidly secured at their rear ends to a transverse rod 37 which is loosely pivoted in brackets 17. This connection of the writing platen 11 with the brackets 17 permits the platen to be thrown upwardly and rearwardly so as to provide for inspection and repair or adjustment of the parts of the transmitter beneath it, without disconnecting or removing the platen from the instrument, and it also provides for a slight downward movement or play of said platen under the pressure of the transmitting tracer 12 during the operation of writing and transmitting, for a purpose which will hereinafter be explained. Downward movement of the writing platen 11 is limited by a bracket 39 (Figs. 4, 5, 6, 8, 9) extending upwardly from the base 7 and in which is mounted a vertically movable button 40 carried by a metal plate 41 and the head of which is engaged by a plug 42 of insulating material carried by a projection 43 extending downwardly from the under side of the writing platen 11. The plate 41 is pivoted at one end in the bracket 39 and is engaged on its under side by a spring 44 coiled about a headed bolt 45 (Figs. 6, 8 and 9) so that normally said plate 41 and button 40, and, therefore, platen 11, are held yieldingly in the raised position in which they are shown in Fig. 9, for example, but are movable downwardly from this position, under the pressure of the transmitting tracer 12 on the platen 11 during the writing operation, for a purpose which will hereinafter be explained.

The transmitting tracer 12 is pivotally mounted, so as to be freely movable in all the directions in which a writing instrument must move in writing, in the converging ends (or one of them) of a pair of pivotally connected rods 46, 47, (see Figs. 4–6, 8, 9) the opposite ends of which are pivotally connected, so as to be freely movable in all the required directions, with the outer ends of a pair of arms 48, 49, pivotally mounted, so as to oscillate horizontally as the transmitting tracer 12 is moved in writing, on a pair of vertical posts 50 secured to the base 2. The arms 48, 49 have adjustably connected with them a pair of arms 51, 52, respectively, which in turn are provided, at their outer ends, with spring plates 53, 54, respectively, in which are journaled roller contacts 55, 56, respectively, (Figs. 4, 5) which, as the arms or bell crank levers 46, 48, and 47, 49 are oscillated by the movement of the transmitting tracer 12, move back and forth between the opposite ends of a pair of rheostats 57, 58, respectively, of suitable shape and material, mounted on the base 7, and which, as will presently more fully appear, are each in circuit with the battery 4 and through which, as will also presently appear, currents, varying in strength in accordance with the movements of the transmitting tracer in writing, are shunted into the main line circuits connecting the transmitting instrument with the receiving instrument to which it is to transmit messages. As the transmitting tracer must be supported above the writing platen 11, and as the rheostats 57, 58 are located beneath the writing platen 11, the arms 48, 49 with which the rods 46, 47 are pivotally connected, it will be observed, extend upwardly from posts 50 above the plane of the writing platen 11, while the arms 51, 52 carrying the contacts 55, 56, are arranged upon the posts 50 beneath the platen 11 and in the same plane with the rheostats 57, 58.

To render the arms of each pair 48, 51, and 49, 52 adjustable relatively to each other angularly, each of the lower arms 51, 52 is provided with a sleeve 59 (Figs. 4, 5) which fits over the post 50 and each of the upper arms 48, 49 with a hub 60 which in turn fits over the sleeve 59, this hub being in turn provided with a radial arm 61 having a concentric slot 62 in which loosely fits the shank of a set screw 63 carried by the lower arm 51 or 52 of the pair. From this construction it results that the two arms 48, 51 and 49, 52 of each pair may, by loosening set screw 63, be adjusted angularly with relation to each other and, by then tightening said set screw, rigidly connected together in their position of adjustment. As the arms 48, 49, and 51, 52 are of metal and as the currents shunted from battery 4 into the main line circuits leading from the transmitting instrument are to pass from rheostats 57, 58, through the lower arms 51, 52, as hereinafter more fully described, the upper arms 48, 49 are each electrically insulated from their arms 51, 52, respectively, by a sleeve 64 of insulating material interposed between the sleeve 59 and hub 60, and rings 65 of like material between the under face of arm 61 and the lower arm 51 or 52 and the upper face of arm 61 and a metal washer 66 interposed between it and the head of set screw 63. (Figs. 4–6, 8).

One terminal of rheostat 57 is at all times connected by wires 67, 68 with the negative pole of battery 4, the corresponding end of rheostat 58 being also connected therewith by wires 69, 68, this pole of battery 4, it will be observed, being grounded. (Figs. 1, 2 and 3) so that the currents supplied by battery 4 to the main line circuits, as hereinafter described, or when it is serving as the local battery of the receiver, are positive. Normally, the master switch 3 or 3ª of each station occupies the position in which it is shown in Figs. 8, 9, 11 and 14, for example, that is, with the transmitter of the station "off" and its receiver "on" or ready to receive messages, and in this normal position of the switch the opposite ends of the rheostats 57, 58 are not connected with the positive pole of battery 4. When, however, the master switch 3 is rocked forward from this position, by means of its hand lever 20, as before described in connection with the operation of shifting the paper strip 5, these ends of rheostats 57, 58 are connected with the positive pole of battery 4,—the rheostat 57 by wires 71, 72, contacts 73, 74 (which in this position of the master switch 3 are electrically connected by a contact plate 75 carried by the sleeve 20ª on master switch 3) and wire 76, and the rheostat 58 by wires 77, 72, contact 73, plate 75, contact 74 and wire 76. In this position of the master switch also (see, for example, Figs. 12 and 15) two suitably separated contact plates 78, 79 carried by and suitably insulated from master switch 3 close the main line circuits from the transmitting instrument to the receiving instrument to which it is to transmit messages, the former (plate 78) by engaging and electrically connecting a pair of upper and lower contacts 80, 81 interposed in the right hand main line circuit, and the latter (plate 79) by engaging and electrically connecting a pair of upper and lower contacts 82, 83 interposed in the left hand main line circuit. With master switch 3 in this position, the right hand main line circuit from the transmitting station (see Fig. 1) consists of arm 51, wire 84, right secondary winding 85 of an induction coil 85ª (the function of which will be hereinafter pointed out) wire 86, contact 80, plate 78, contact 81, and wire 87 leading to the right hand side of the receiving instrument, (as 2ª, Fig. 2); while the left hand main line circuit consists of arm 52, wire 88, left secondary winding 89 of the induction coil just referred to, wire 90, contact 82, plate 79, contact 83, and wire 91 leading to the left hand side of the receiving instrument.

As the main parts of the receiving instrument will now be described with that instrument "on" or receiving messages, as in Fig. 2, the description of the master switch will, for convenience and clearness, be continued mainly with reference particularly to Fig. 2 in which it is designated as 3ª. It will be understood, of course, that any description of the construction and operation of switch 3ª,—also of battery 4ª of Fig. 2,—will be equally applicable to the switch 3 and battery 4, respectively, of Fig. 1, and vice versa.

The master switch of the station to which messages are to be transmitted must, in order that such messages be received and recorded by the receiving instrument, be in its normal position, with the transmitter of that station "off" and the receiver thereof "on"; and the master switch 3ª of Fig. 2 (the station to which the transmitter of Fig. 1 is shown as transmitting) must be assumed to be in this position. In this position of the master switch 3ª, its contact plate 75 is out of engagement with contacts 73, 74, (see Figs. 7, 8) so that the circuit from battery 4ª through rheostats 57, 58 of that station is open. In this position of the master switch 3ª, also, its plates 78, 79 are lowered out of engagement with upper contacts 80, 82, respectively, (see Figs. 7 and 9) and into engagement with two contacts 92, 93, respectively, (see Figs. 9 and 16) the contact 92 being electrically connected by plate 78 with under contact 81, heretofore referred to, and the contact 93 by plate 79 with under contact 83, heretofore referred to. With the master switch 3ª in this position, the right hand main line circuit from Fig. 1 entering and passing through the receiving instrument 2ª of Fig. 2 consists of line wire 87 already referred to, contact 81, plate 78 of master switch 3ª, contact 92, wires 94, 94ª leading to a spring contact plate 94ᵇ, contact plate 94ᶜ (normally in contact with plate 94ᵇ as shown), and wire 94ᵈ leading therefrom to a vertically movable coil 95 on the right hand side of the receiving instrument, and wires 96, 97 leading thence to ground at 98, Fig. 2, and back to the negative of battery 4, Fig. 1; while the left hand main line circuit consists of wire 91, before referred to, contact 83, plate 79 of master switch 3ª, contact 93, wire 99 leading therefrom through the winding of a combination relay 100 (the functions of which will be hereinafter fully described), wire 101 leading therefrom to a vertically movable coil 102 at the left hand side of the receiver and wires 103 and 97 leading thence to ground at 98 and back to the negative of battery 4, Fig. 1. This combination relay 100, with the circuit closing devices controlled by it, and hereinafter described, will be claimed herein in connection with telautographic apparatus, and is more broadly claimed in my application filed May 16, 1907, Serial No. 374,038.

The coils 95, 102, just referred to, are carried by a suitable stand or frame 104, having a rear lining or slab 105 of insulating material and a base 106, and consist of suitably wound hollow metal frames 107 fitting loosely over the vertical cores 108 of a field magnet 109 (suitably supported from the base 106 and back 105 of the frame 104) and in openings 110 in the pole piece 111 thereof.

The frame 107 of each coil has inwardly punched projections or fenders 107ª for engaging the core 108 and centering the coil and reducing friction between it and the core. Normally these coils 95, 102 are at the upper ends of the openings 110 (see Fig. 24) in which position they are held by chains 112 and springs 113. Each of the springs 113 is in turn adjustably supported on a standard 114 rising from the base 115 of a frame 116 which, for convenience, is secured to the upper end of the magnet 108 inclosed by the coil 95 or 102 which it supports, and the means for so securing the frame to the core 102 is such,—for example, a bolt and slot 117, 118 (see Fig. 22),—as will permit of the adjustment of the two frames 116 to proper position on their supports and to and from each other. The means for adjustably supporting each spring 113 and its coil 95 or 102 consist of an arm 119 slidably mounted on standard 114 and having an opening in which the spring 113 fits loosely, and a nut 120 having an interior screw thread engaging the coils of the spring 113 and which thus supports said spring on the arm 119. A thumb nut 121 threaded on the upper end of the standard 114 abuts against the lower end of arm 119 and a set screw 122 on the hub of arm 119 engages a vertical slot 123 in the upper end of the standard 114. It will be obvious that by turning nut 120 the spring 113 may be adjusted up or down, and its tension thus increased or decreased, and also that by moving the thumb nut 121 up or down, said spring and the arm 119 may be adjusted to any desired position lengthwise of standard 114 and held in that position by nut 121 and also set screw 122 which, in addition to preventing vertical displacement of the arm 119, will, by its engagement with slot 123, also prevent turning of the arm on the standard 114.

In the normal position, just described, of the master switch 3ª, the battery 4ª of Fig. 2 serves as a local battery for the receiving instrument, one of the functions performed by it being the energization of magnet 109, the circuit through which it does this work consisting of wire 76 from the positive pole of the battery, wire 124, a magnet 125 (the function of which will presently be described), wire 126 to magnet 109, wire 127 leading therefrom to a contact plate 128 carried by but insulated from the armature 128ª of relay 100, contact 129 for plate 128, and wire 130 leading therefrom to the negative pole of battery 4ª and ground. When the master switch 3ª is in normal position and current is passing over the left hand main line circuit from battery 4 of the transmitting instrument (Fig. 1) the relay 100, through which this circuit passes, as heretofore described, will be energized and attract its armature 128ª which will cause plate 128 to engage contact 129 and thus close the circuit just described through magnet 109 from battery 4ª and this local circuit will remain closed so long as there is any current on the left hand main line circuit. The battery 4ª also serves, through the local circuit just described, to energize the magnet 125 above referred to, the function of which is to lock the master switch 3ª in its normal or "receiving" position with the transmitter "off" and retain it in that position so long as any current is on the left hand main line circuit and thus prevent interruption of a message by the operator in charge of the station to which the message is being transmitted. This locking of the master switch 3ª is accomplished by the armature 131 of magnet 125, which, as shown in Fig. 17, is carried on the rear end of a lever 132 pivoted, at a suitable point intermediate its ends, to hand lever 20 so that normally the armature 131 will be raised away from magnet 125 and the forward end of lever 132 rest against a lower stop 133 on a plate 134 adjustably fixed to one of the side walls of the casing 6. The lever 132 is provided at its forward end with a shoulder 135 which, when armature 131 is attracted by magnet 125 and the forward end of lever 132 therefore raised into the position shown by dotted lines in Fig. 17, will be in line with a stop 136 on the plate 134 and thereby prevent any forward movement of hand lever 20 or rocking of master switch 3ª. When magnet 125 is deënergized, lever 132 will return to its normal position, in which it is supported by the lower stop 133.

The operation of the apparatus as thus far described is briefly as follows: Normally, as heretofore stated, the master switch of each station is in the position illustrated in Figs. 7, 8, 9, 11, and 15, that is to say, with its plate 75 out of engagement with contacts 73, 74, (the independent current-supplying circuit from battery 4 or 4ª through the rheostats 57, 58 of the station thus being open) and its plates 78, 79 out of engagement with upper contacts 80, 81, (the transmitting instrument in this position of the master switch being "off") but in engagement with and connecting, respectively, contact 81 with contact 92 and contact 83 with contact 93, as shown in said figures of the drawings, the receiving instrument in this position of the master switch being "on" or in condition to receive messages. Let us assume now that a message is to be transmitted say from the home station, Fig. 1, to the distant station, Fig. 2. The operator at the former will turn the master switch 3 by pulling lever 20 forward to the position shown by dotted lines Fig. 12. Before doing this he must, however, release lever 27 from catch 30 (by depressing button 33 with the point of the tracer 12, as heretofore described). When lever 27, thus released, is rocked forward against the pull of spring 25, by the operator, roll 15 is rotated by pawl and ratchet 23, 24, thus feeding a fresh portion of strip 5 into position over platen 11, and also rocking the master switch 3 to the position shown in Figs. 12 and 14, in which position it is then held, with lever 27, by catch 30 which engages rear notch 29 in the lever 27. In this position of the master switch 3, its plates 78, 79 are disengaged from contacts 92, 93, respectively, and connect contact 80 with contact 81 and contact 82 with contact 83, respectively, while its plate 75 connects contacts 73, 74; with the result that the circuit from battery 4 through rheostats 57, 58 of that station is closed and the main line circuits to the distant receiver Fig. 2 are also closed. The master switch, as 3ª, Fig. 2, being, of course, in normal position with the receiver of that station "on" and the transmitter thereof "off", positive current passes from the circuit of battery 4, Fig. 1, through the rheostats 57, 58, into the main line circuits from the transmitting instrument of Fig. 1 to the receiving instrument of Fig. 2, a portion of the current also passing through the rheostats to the negative pole of battery 4. The right hand main line circuit in such case is (Fig. 1) arm 51, wire 84, secondary winding 85 of the induction coil, wire 86, contact 80, plate 78 of master switch 3, contact 81, wire 87, and (Fig. 2) wire 87, contact 81, plate 78 of master switch 3ª, contact 92, wires 94, 94ª, contact plates 94ᵇ, 94ᶜ, wire 94ᵈ, coil 95, and wires 96, 97 to ground; while the left hand main line circuit is (Fig. 1) arm 52, wire 88, secondary winding 89 of the induction coil, wire 90, contact 82, plate 79 of master switch 3, contact 83, wire 91, and (Fig. 2) wire 91, contact 83, plate 79 of master switch 3ª, contact 93, wire 99, to relay 100, wire 101 to coil 102, and wires 103, 97, to ground.

So far as the right hand main line circuit is concerned, during the transmitting operation it performs simply the function of controlling the movements of its coil 95 but the left hand main line circuit performs not only the function of controlling the movements of its coil 102 but also the function of controlling various local circuits in the receiving instrument, including that from battery 4ª (which when the station is receiving becomes a local battery as before stated) for energizing field magnet 109 and lock magnet 125, and other circuits hereinafter described. As soon as current traverses the left main line circuit from Fig. 1 (in other words, as soon as master switch 3 has been rocked to the position shown in Figs. 12 and 14), relay 100 is energized and attracts its armature 128ª, thus closing the local circuit before referred to, viz.,—wires 76, 124, 126, 127, contact plate 128, contact 129, and wire 130,—through field magnet 109 and lock magnet 125, with the result that the former is energized for the operation of the coils 95 and 102 and the latter is energized so as to attract its armature 131 and thus, through lever 132, the shoulder 135 thereon and the stop 136 on the wall of the casing 6, lock the master switch 3ª against movement by the operator from its normal position and consequent interference with or interruption of the message to be transmitted. The transmitting tracer, Fig. 1, being then moved by the operator over the platen 11 and record strip 5 thereon to write or trace the message to be transmitted, the arms 51, 52, will be oscillated on their posts 50 and the roller contacts 55, 56 moved back and forth between the terminals of the rheostats 57, 58 (the direction and extent of their movements depending upon the direction and extent of movements of the transmitting tracer) with the result, as is well understood by those familiar with telautographs of the general type here described, that currents, varying in strength in accordance with the positions assumed by the transmitting tracer, are shunted from the independent circuit of battery 4, through rheostats 57, 58, into the main line circuits leading to the receiving instrument, Fig. 2. These currents of varying strength so shunted from the independent circuit of Fig. 1 into the main line circuits produce vertical movements of the spring-sustained coils 95, 102 in the openings 110 in the pole piece 111 of field magnet 109, the extent and direction of which movements depend upon the strengths of the currents sent over their respective main line circuits, and these movements of the coils in turn control the movements of the receiving pen 137 so as to cause it to follow the movements and reproduce the writing of the transmitting tracer. The receiving pen with the connections between it and the coils 95, 102 will presently be described. When the transmitting operation is ended, the operator in charge of the transmitting instrument, Fig. 1, will, of course, return lever 20 and master switch 3 to their normal positions, when, the main line circuits being thereby opened, relay 100 will be deënergized and release its armature 128ª, thereby opening the local circuits from battery 4ª through magnets 109 and 125, with the result that both said magnets will be deënergized and the latter release its armature 131 and the arm 132 and thus unlock lever 20 of master switch 3ª so that the operator in charge of the station, Fig. 2, may shift the master switch 3ª of that station so as to throw receiver 2ª, Fig. 1, "off" and its transmitter 1ª "on" should he desire to transmit messages to the home station, Fig. 1. For the purpose of preventing sparking between contact 129 and contact plate 128 when the local circuits from battery 4ª are broken, a shunt 129ª containing a condenser 130ª is provided from wire 127 to wire 130 around contact 129. This break in the main line circuits also occurs whenever during a transmitting operation it is found necessary to shift fresh portions of paper strip 5 into position over writing platen 11, and this break and consequent make in the left hand main line circuit, in shifting strip 5, are utilized for the setting and operation, respectively, of paper shifting mechanism at the receiving instrument, through electrical connections hereinafter described. The breaking and making of the main line circuit, as will hereinafter appear, also effects the movement of the receiving pen in its unison position to and from the bottle from which it is supplied with ink, as will hereafter appear.

The receiving pen 137 consists of two converging pointed nibs adapted to contain ink between them which is supplied to the pen from a bottle 138 (see Fig. 20). The pen 137 is clamped by a set screw upon the outer end of one of a pair of converging pen arms 139, 140, the inner ends of which are pivotally connected with the ends of a pair of arms 141, 142, respectively, the opposite ends of which are provided with hubs 143 and set screws 144 by which they are adjustably secured to a pair of shafts 145, one of which is journaled in the upper ends of standards 146, 147 rising from the frame 116 from the standard 114 of which coil 95 is suspended, while the other is journaled in brackets 148, 149 rising from the frame 116 from the standard 114 of which coil 102 is suspended. The outer standard 146, 148 of each pair, it will be observed, projects toward the front of the machine so that the arms 141, 142 and pen arms 139, 140, will project outside the plane of movement of paper strip 150 on which pen 137 is to record the messages received, pen 137, as will also be observed, projecting inwardly from pen arms 139, 140 toward the surface of strip 150. The strip 150 it may be stated here is supplied from a reel 151 below the base 106. As best shown in Fig. 24, the strip enters the receiving instrument through a slit 152, at the lower end thereof, passes over a guide plate 153 (hereinafter more fully described) secured by screws to a frame or support 154 resting upon and fixed to the pole piece 111 of magnet 109, and finally leaves the receiving instrument through a guide 155 at its upper end. Near their inner ends the shafts 145 have fast to them segmental pulleys 156 (one for each coil 95, 102) and each of these pulleys has two peripheral grooves 157, 157ª arranged side by side, for receiving two turns of the chain 112 of its coil 95, 102. It will be apparent from this that as the coils 95, 102 are moved vertically in opposite directions, their movements will be transmitted, through shafts 145, and arms 141, 142 to the pen arms 139, 140 which in turn will cause the pen 137 to describe over the surface of paper strip 150 the same movements as the transmitting tracer 12, and produce on such surface the writing produced by the tracer at the transmitting instrument.

In Fig. 2 the receiving pen 137 is shown as being so moved, while in Fig. 1 it is shown as at unison or in its normal position, in which position it is held by the springs 113 of the coils 95, 102 through the connection of said springs with shafts 145. In this position the arms 141, 142 rest against stops 158, 159, respectively, pivotally mounted on the shafts 145 on which they are adjustable by means of adjusting screws 160 carried by them and bearing against the standards 146, 148.

In its unison position the receiving pen 137 enters an opening 161 in the lower end of the ink bottle 138, so as to be kept supplied with ink; the bottle 138 being corked or otherwise closed to the atmosphere except through this bottom opening 161, of course, and supported in proper position with relation to the receiving pen 137 by a holder 162 having a downwardly projecting slotted part connected by a thumb nut and screw 162$^a$ (as shown in Figs. 24, 28) with a side extension 153$^a$ of paper guide plate 153$^b$ so that the holder may be adjusted vertically to proper position with relation to pen 137. A strip 153$^b$ secured to guide plate 153 and provided at its outer edge with a beveled flange 153$^c$ engages one corner of the bottle and coacts with the holder 162 in holding it in position, the result of tightening thumb nut 162$^a$ being to tilt the upper end of the holder 162 forward and thus clamp the bottle tightly between the holder and flange 153$^c$. Also on loosening thumb nut 162$^a$ the upper end of holder 162 may be tilted rearward to release the bottle or to receive a bottle. The flange 153$^c$ conforms to the contour of the bottle corner which it engages (see Fig. 22) so as to not only securely clamp the bottle, but also aid in centering or adjusting it to its proper position so that its opening 161 (cut at a predetermined distance from this corner of the bottle) will be in proper position for receiving the nibs of the receiving pen. Holder 162 may be provided with a chamber 162$^b$ beneath the bottle 138 for receiving any small quantity of ink that may drip from opening 161.

Thus far the description of the receiving pen 137 has been confined to its movements over the face of the strip 150 in reproducing the writing performed by the transmitting tracer and to the devices for producing these movements. Other movements of the receiving pen are, however, necessary, namely, first to withdraw it from the ink bottle, 138, then, after it has been moved to a position over the surface of the strip 150, move it to and from said surface, (to control the making of the record thereon) as the transmitting tracer 12 is raised from normal position and moved to and from the writing platen; and to also move it again into the ink bottle during the writing operation, for a fresh supply of ink, or after the writing operation is concluded,—and all of these movements must, of course, be controlled from the transmitting instrument. The devices provided for producing these to and fro movements will now be described.

Referring to Figs. 1, 2, 20–24, it will be observed that the receiving instrument is provided with a magnet 163 (hereinafter called the "pen lifter magnet") secured, by a bracket 164, to the paper guiding plate 153 and the swinging armature 165 of which is pivotally mounted, by arms 166, on the bracket 164. The armature 165, which is slightly above the upper edge of guide plate 153, is held in its normal retracted position toward the back of the receiver casing by a spring 167 connected at one end with the rear end of bracket 164 and at its other end with a rod 168 held in ears 169 projecting from arms 166. The rod 168 is provided with a second rod or pen-arm rest 169$^a$ which projects over the upper edge of guide plate 153 and in the normal or retracted position of the swinging armature 165 of magnet 163, the pen-arms 139, 140 clear this rod 169$^a$. In this position of the armature 165 and rod 169$^a$, pen-arms 139, 140 and pen 137 occupy their innermost position, with the pen 137 either in the bottle opening 161 or against the surface of the paper strip 150. When, however, magnet 163 is sufficiently energized to attract its armature 165 pen-arms 139, 140 are moved outwardly by pen rest 169$^a$ and pen 137 withdrawn from bottle opening 161, or from the surface of the paper, as the case may be. The energization of magnet 163 is effected by battery 4$^a$ in the closed condition of the left hand main line circuit, heretofore described, through a branch circuit from field magnet circuit 76, 124, 126, 127, 128, 129, 130, and consisting of wire 170 leading from the winding of magnet 109 to magnet 163, wire 171 leading from magnet 163 to a contact 172 fixed at one end in one end of a tube 173 and the opposite end of which contact is flexible and loose, a second contact 174 rigidly fixed in the opposite end of tube 173 and between which and the free end of contact 172 there is a certain amount of looseness so that the free end of contact 172 may have a certain amount of play relatively to contact 174 with which, however, it is normally in engagement (see Fig. 31) and wires 175, 176 leading from contact 174 to the wire 127 of the field magnet circuit. The tube 173 is hermetically closed and preferably has the air exhausted from it so as to prevent oxidation of contacts 172, 174.

From this construction it results that on the closing of the left main line circuit, by the shifting of the master switch 3 to the position shown in Figs. 12, 14, the relay 100 is energized and the field magnet circuit thus closed by the movement of contact plate 128 into engagement with contact 129, as before described, the branch circuit just described through pen lifting magnet 163 being also closed by engagement of loose contact 172 with fixed contact 174. Pen lifter magnet 163 being thus energized will attract its armature 165, moving it outwardly toward the front of the receiver, and as the armature 165 is thus moved the pen rest 169ª, moving with it, will move the pen-arms 139, 140, outwardly, thus lifting or withdrawing pen 137 from bottle opening 161. The transmitting tracer being then moved from unison position to a position above the writing platen 11, the receiving pen will, following the movements of the transmitting tracer, take up a position in front of and out of contact with record strip 150. So long as the loose contact 172 just referred to remains in a state of rest, in engagement with fixed contact 174, the receiving pen will maintain the position just referred to in front of and out of contact with the record strip 150,—the branch circuit through the pen lifting magnet 163 being closed by the contacts 172, 174. Means are provided, however, for, in effect, opening this branch circuit while current is on the left main line, so that the pen lifter magnet 163 will be practically deënergized and the receiving pen thus caused to move toward and in contact with the record strip 150, and to thereafter move over the surface of such strip so long as the transmitting tracer remains in contact with and moves over the platen 11 or paper strip 5 thereof. It may be noted here that, after a writing operation, when the transmitting tracer is returned to its unison position, the receiving pen will take up a corresponding position opposite its ink bottle, 138, and, when the master switch 3 is rocked rearwardly from the position shown in Figs. 12 and 14 to the position shown in Fig. 15, thus breaking the main line circuits, the pen lifter magnet 163 will, of course, be deënergized, its armature 165 swung back, and the receiving pen moved inwardly toward the ink bottle 138. The means provided for so opening this branch circuit through the pen lifter magnet will presently be described. The swinging pen lifting armature 165, movable across the vertical plane of the poles of the magnet, is preferred to one which moves in such vertical plane to and from the poles, for the reason that its initial movement when attracted by the magnet 163 is rapid, gradually slowing down as it nears its forward position, where the pull of the magnet and the pull of the armature spring 167 are balanced, so that the receiving pen is moved thereby as quickly from the surface of strip 150 as the tracer 12 is moved by the operator from the surface of strip 5 or platen 11.

The condition of the loose contact 172 is controlled by the transmitting tracer 12, so that when said tracer is raised from its rest, at its unison point, or is raised, from time to time, from the writing platen 11 during the writing operation, the loose contact 172 will be in a state of rest against fixed contact 174 and, as just described, the pen 137 be moved and held away from its unison point or bottle opening 161 or from the surface of the paper strip 150, as the case may be. When, however, the transmitting tracer 12 is lowered, from time to time during the writing operation, into contact with its record strip 5, this condition of loose contact 172 with relation to fixed contact 174 is disturbed, said loose contact at such times being in a state of agitation, with the result that the branch circuit for pen lifter magnet 163 is repeatedly interrupted so that its armature 165 and pen rest 169ª are held retracted by spring 167 and pen 137 thus moved inwardly, by the resiliency of its arms 139, 140, into contact with record strip 150 or into bottle opening 161, as the case may be, and will retain such position so long as the transmitting tracer 12 remains lowered and will thus, while in contact with strip 150, reproduce the movements of and writing performed by the transmitting tracer.

The means by which the condition of loose contact 172 relatively to fixed contact 174 is thus controlled by the transmitting tracer 12 will now be described. Referring particularly to Fig. 31, it will be observed that the tube 173 is secured by a suitable socket 177 to the center of a thin iron plate or diaphragm 178 provided with a flange 179 by which it is held in position on the upper end of relay 100. When said relay is energized by the current on left hand main line circuit, as heretofore described, it will attract and pull downwardly slightly the central portion of the diaphragm 178 and when it is deënergized will release said diaphragm, tube 173, of course, moving with the diaphragm. So long as the current passing through relay 100 is constant, loose contact 172 will be in a position of rest with relation to and in engagement with fixed contact 174, and thus close the branch circuit through pen lifting magnet 163. Should, however, vibrations occur in the current passing through the relay it will be apparent that diaphragm 178 will be rapidly vibrated, and loose contact 172 disturbed from its normal state of rest and put into a state of vibration or agitated with relation to fixed contact 174, with the result that the branch circuit through pen lifting magnet 163 will be so interrupted that magnet 163 will be practically deënergized and the armature 165 thereof, as well as pen rest 169ª, therefore occupy their retracted, rearward positions (see Figs. 23, 24), thus leaving the receiving pen 137 in its innermost position in the bottle opening, 161, or against the surface of strip 150, as the case may be. Such vibrations in the left main line circuit are produced by the lowering of the transmitting tracer 12, as will now appear.

Referring to Fig. 1, it will be observed that the transmitting instrument is provided with an interrupter magnet 180 included in a local circuit of battery 4 consisting of wire 76 from positive pole of battery 4, contact 74, plate 75 of master switch 3, contact 73, wires 72 and 77, wire 181 to contact 182, armature 183, wire 184 leading therefrom to magnet 180, wire 185 leading thence to the primary winding 186 of the induction coil 85ª, and wires 187 and 68 leading from the latter to the negative pole of battery 4 and ground. For the purpose of avoiding sparking at the contact 182 and armature 183, as the latter is repelled, a shunt circuit 181ª containing a condenser 181ᵇ, is formed, from wire 181 to armature 183, around contact 182. It will also be observed that a short circuit is provided around the primary winding 186 of induction coil 85ª, consisting of wire 188 connecting wire 185 with contact plate 41, before referred to, under platen 11 (see Figs. 8, 9), contact 189 engaging said plate, and wires 190, 69 and 68 leading therefrom to the negative pole of battery 4. With these two circuits the interrupter magnet 180 and its armature 183 are operated continuously, through one or the other, so long as the master switch remains in transmitting position, with its contact plate 75 connecting contacts 73, 74. In the raised position of the transmitting tracer 12, the short circuit around primary winding 186 of induction coil 85ª is closed by the engagement of contact plate 41 and contact 189 under the platen 11, so that the current from battery 4 does not pass through the primary winding 186 but by wires 190, 69 and 68 to the negative pole of battery 4, no vibrations therefore being produced in the main line circuits, with the result that loose contact 172 in tube 173 above combination relay 100 will be at rest against fixed contact 174 and thus properly close the circuit through pen lifting magnet 163 to cause it to attract its armature 165 and move and hold the receiving pen 137 in its outer position away from the surface of strip 150. When, however, the transmitting tracer is lowered to writing position and therefore depresses platen 11 against the pressure of spring 44, the contact plate 41 will be depressed (by projection 43 engaging button 40, Figs. 1, 8, 9), out of engagement with contact 189, thereby opening this short circuit. The interrupter current will thereupon pass, by wires 185, 187, and 68 through the primary winding 186 to the negative pole of battery 4 and thus induce vibratory currents, superposed upon the right and left hand writing currents. Each time the tracer 12 is raised primary winding 186 is short circuited. The vibratory currents thus traversing the two main line circuits, while the transmitting tracer is lowered, serve to vibrate slightly the operating parts of the receiver and thus overcome their friction of rest so that they may be more easily operated; while the vibrations in the left hand main line serve the additional function, heretofore referred to, of keeping the loose contact 172 above combination relay 100 in a state of agitation so that the pen lifter magnet circuit is interrupted and said magnet practically deënergized with the result that its armature 165 is retracted and permits receiving pen 137 to approach and rest against the surface of the record strip 150, which position it will retain, reproducing on said strip the writing produced by the transmitting tracer, until the tracer is again raised.

The armature 128ª, as will be observed on reference to Fig. 32, is of large area and comparatively thick, (being preferably of the disk shape shown) so that, unlike the delicate, loose contact 172 in tube 173, it is unaffected by these vibrations on the left main line circuit, but notwithstanding them, maintains contact plate 128 in engagement with contact 129 and thus maintains the circuit from battery 4ª, for field magnet 109 and lock magnet 125, closed. It will also be observed that in its normal retracted position (Figs. 1, 3, 31) the free end of spring contact plate 128 rests against it, being engaged by a contact 128ᵇ on the under side of the armature 128ª; while in its attracted or raised position the armature is moved away from spring contact plate 128, leaving it in engagement with contact 129 which limits its upward movement, as shown in Fig. 2. It will also be observed that the armature 128ª and contact plate 128 are insulated from each other, as shown at 128ᶜ (Fig. 31). The purpose of this peculiar arrangement of the armature 128ª and contact plate 128 is to provide for the short circuiting of part of the winding of field magnet 109, when the local circuit from battery 4ª is broken by the disengagement of contact plate 128 and contact 129, and to thus reduce its rate of magnetic discharge and preserve the insulation of the receiver against injury. For this purpose the frame of relay 100 is connected by wires 100ª and wire 170 with the magnet 109 at a point in close proximity to the negative pole of said magnet, so that when relay 100 is deënergized and releases its armature 128ª and said armature and contact plate drop to the position shown in Figs. 1, 3, 31 (with contact 128ᵇ on the former resting against the latter) a short circuit, consisting of wires 170, 100ª, armature 128ª, contact 128ᵇ, plate 128, and wire 127, is formed around a part of the winding of magnet 109. This short circuit will of course be broken when, on the energization of relay 100 as before described, armature 128ª and plate 128 move upward and become separated by the engagement of the latter with contact 129 and the movement of the former away from it to the position shown in Fig. 2 in which position contact 128ᵇ is disengaged from plate 128.

It will of course be understood, from the description above given of the devices for effecting the to and fro movements of the receiving pen relatively to the recording strip 150 or the bottle opening 161, and the description preceding it of the devices for effecting the movement of the receiving pen over the recording strip 150 to reproduce the writing performed by the transmitting tracer, that, starting with the transmitting tracer at unison or in its normal position, the first movement given it by the operator is to raise it and then move it laterally to a position over the writing field of platen 11,—and it will also be understood that the receiving pen will at the same time be withdrawn from the bottle opening 161 and then moved laterally to a position over the writing field of recording strip 150. The transmitting tracer being then lowered onto the platen, the receiving pen will be moved inwardly into contact with recording strip 150 and the transmitting tracer being then moved over its writing platen to trace or write the message the receiving pen will be correspondingly moved over the surface of the recording strip 150 reproducing thereon the writing performed by the tracer. When the tracer is raised to dot an "i" or cross a "t" or to make a change or correction in matter previously written or to begin a new line,—the receiving pen will in like manner be moved away from recording strip 150 and then be brought again into contact with it whenever the transmitting tracer is lowered into contact with its writing platen. Also, whenever the paper at the transmitter is to be shifted and the transmitting tracer is therefore raised from its writing platen and moved to its unison point, as hereinafter described, the receiving pen is also moved away from recording strip 150 and then to its unison point, namely, bottle opening 161 which it enters when, as hereinafter described, the transmitting tracer is lowered at its unison point.

It has been found in practice that when the receiving pen is first moved laterally from its unison position, by the current on the main line circuits, its movement is sudden and has a tendency to carry it upward to such an extent that it is liable to catch on the upper edge of the guiding plate 153 and to remain in that position and thus not respond to the movements of the transmitting tracer. To overcome this difficulty I provide one of the pen arms (140) with an inwardly projecting hook 140ª (Figs. 31, 35) which as the pen moves upwardly will engage the rod or pen rest 169ª and thus limit the upward movement of the pen and prevent it catching in the upper edge of the guiding plate 153.

The devices for shifting the paper strip 150 at the receiving instrument, from the transmitting instrument, will now be described. The paper guiding plate 153 is provided with a guide 191 at its lower edge under which the strip 150 passes and with side guides 192 (the one to the left being formed on plates 153ᵇ) extending over the edges of the strip and preventing lateral displacement thereof. Upon leaving guiding plate 153 the strip passes between a pair of guides 193 fixed to the lower ends of a pair of arms 194 suspended from brackets 195 fixed to the back board 105 of the receiver frame; thence between the outer face of a rocking armature 196, pivotally mounted by arms 197 and a shaft 197ª in brackets 195, and a swinging bar 198 pivotally mounted in arms 197, so as to move with armature 196; and finally leaves the receiving instrument through the guide 155, the upper edge of which is serrated, (see Fig. 20) so that when desired projecting portions of the strip 150 may be severed. The bar 198 is provided preferably with a strip 199 of some yielding material so as to insure a perfect grip, between it and the outer face of armature 196, upon the strip 150 when, as will presently appear, the armature and bar are swung upwardly to shift the strip 150. The magnet 200 for armature 196 is also mounted in the brackets 195 and (as shown in Fig. 2) is designed to be energized by battery 4ª through a circuit controlled by combination relay 100 and consisting of wires 76, 124 from positive pole of battery 4ª, magnet 125, wire 126, wire 201 to magnet 200, wires 202, 176, contact 128 carried by armature 128ª of relay 100, contact 129, and wire 130 to the negative pole of battery 4ª. It will be understood that when the master switch of the transmitting instrument (as 3 of Fig. 1) is rocked from normal position, and the main line circuits to the distant receiver (as 2ª of Fig. 2) therefore closed, as before described, the paper shifting circuit just described will be closed by the engagement of contact plate 128 with contact 129, due to the attraction of armature 128ª by relay 100, and paper shifting magnet 200 will be energized, and attract its armature 196, swinging it upwardly from the position shown in Figs. 23, 24 to that shown in Fig. 25, in which position it comes to rest against a strip of cushioning material 199ª. It will also be understood that as the armature is thus moved it will carry with it the bar 198 and thus feed the paper strip 150 upwardly, the armature 196 and bar 198, as will be observed, being in such close proximity to the paper guiding chute 155 that on their upward movement they will readily feed the paper through such chute. The armature 196 and bar 198 will remain in this position until the left main line circuit is broken by the return of the master switch, as 3, at the transmitting instrument, to normal position, when the magnet 200 will be deenergized by the opening of its circuit and armature 196 drop, with bar 198, to the position shown in Figs. 23, 24. As the master switch 3 at the transmitting instrument is thus moved from normal position to transmitting position by rocking the hand lever 20 forward, as heretofore described, the paper strip 5 at the transmitting instrument is shifted forward a given distance, and the mechanism for so shifting it is so related to the paper shifting devices of the receiving instrument that at each such operation transmitter paper strip 5 and receiver paper strip 150 will be fed forward an equal distance. Both strips 5, 150 may be shifted any distance desired by rocking the hand lever 20 of the master switch, as 3, at the transmitting instrument, repeatedly back and forth.

As, in moving the master switch from its rearward position to transmitting position, the current when first transmitted over the main lines is very light, because of the position of the roller contacts 55, 56 in proximity to the negative ends of the rheostats 57, 58, and as such current on the left main line might not be sufficient to fully energize combination relay 100 so that it will attract its armature 128ª and close the local circuits which it controls, at the receiver, I have devised means whereby the first part of the current thus sent over the left main line is diverted from the coil 102 and practically its full strength applied to the energization of relay 100. The means I provide for this purpose is a branch circuit consisting of wire 203, connected with wire 101, leading from relay 100 to coil 102, and wire 204 connected with wire 103 leading from that coil to ground; these two wires 203, 204 terminating in contacts 205, 206, respectively, which are normally connected by a contact plate 207 (see Figs. 21, 24, 25, 30) fixed to and rocking with the shaft 197ª through which armature 196 is pivotally mounted in brackets 195. From this it results that the current traversing the left main line circuit, after leaving relay 100, will, instead of taking the path of greater resistance, viz: that including coil 102, traverse the circuit just described made up of wire 203, contact 205, plate 207, contact 206 and wires 204, 103 and 97 to ground; relay 100 thus receiving the full current strength. When paper shifting magnet is then energized by the closing of its local circuit, including contact plate 128 and contact 129, shaft 197ª will be rocked by the arms 197 of armature 196 and contact plate 207 moved to the position shown in Fig. 25. In this position of plate 207 contacts 205, 206 are disconnected and the branch circuit just described broken, the left main line current then passing through the coil 102. Magnet 200 also controls a similar shunt circuit (including, however, a bell) for the right hand coil 95, which will now be described.

It is desirable that each station should be equipped with a bell which can be rung from the distant station so that the operator in charge of the latter may give audible notice to the operator in charge of the former of his intention to transmit a message. Each station is therefore provided with such a bell 208 which may be attached to the receiver frame or to any other convenient place, and each station is also provided with a push button 209 in one of the side walls of the transmitter casing or box 6 (see Figs. 4, 5), which, when pressed inwardly, closes a circuit to the distant receiver, thus ringing the bell 208. This bell circuit can only be closed while the master switch is in its normal position, with the transmitter of the station "off" and its receiver "on", so that the operation of ringing the bell 208 must be performed by the operator before he rocks or shifts the master switch to connect his transmitter with the distant receiver. The button 209, it will be observed, is carried by the spring contact plate 94ᵇ, connected with the wall of the casing 6, and when pushed in it is disengaged from contact plate 94ᶜ (also connected with the wall of casing 6) and engaged with a third contact plate 210 (connected with said wall) and when so engaged closes a circuit from battery 4, of Fig. 1 for example, through the magnet of bell 208, of Fig. 2 for example, consisting of wires 76, 211 from the positive pole of the battery, contact plate 210, contact plate 94ᵇ, wires 94ª, 94, contact 92, contact plate 78 of master switch 3, contact 81, right main line wire 87, and (Fig. 2) wire 87, contact plate 81, plate 78 of master switch 3ª, contact 92, wire 94, wire 94ª, spring contact 94ᵇ, contact 94ᶜ and wire 94ᵈ, and thence by a shunt circuit consisting of wire 212, leading to a contact 213, contact plate 214 on the shaft 197ª of paper shifting armature 196, contact 215 (which in the normal position of the receiver devices is connected with contact 213 by plate 214, as shown in Fig. 23), and wires 216, 217 leading from contact 215 through bell magnet 208 to ground. When the operator in charge of one station has rung the bell 208 of the distant station, the operator in charge of the latter may, through a like circuit to the former, ring the bell 208 thereof and thus indicate to the operator his readiness to receive messages.

It will be understood, of course, that, when paper shifting magnet 200 is energized and attracts its armature 196, moving the latter upwardly, as before described, and rocking shaft 197ª, the contact plate 214, moving with said shaft 197ª, will be moved downwardly from the position shown in Fig. 23 and disengaged from contact 213, thus breaking this shunt or bell circuit.

The master switch 3 or 3ª has a movement, in addition to the back and forth movements heretofore described, and when given this additional movement it places both the transmitter and receiver of the station in their "off" positions so far as the distant station is concerned, and connects the two for testing purposes, as will now be described. Referring now particularly to Figs. 5, 7, and 13, it will be observed that the master switch is so mounted in its bearings 218 rising from the base 7 of the transmitting casing as to be capable not only of rocking thereon, in the manner heretofore described, but of also being moved endwise against the pressure of a spring 219 between its inner end and one of its bearings 218, such endwise movement being given the master switch by engaging a screw driver or other suitable implement with the slotted outer end 220 thereof and pushing it inwardly, and it is held in the position to which it is thus moved by giving the switch 3 about a quarter turn in a counter clockwise direction so as to bring pin 20ᵇ on master switch 3 (which by this inward movement of switch 3 is withdrawn from slot 20ᶜ on the inner end of sleeve 20ª) into engagement with a shoulder 221 on the inner end of sleeve 20ª (see Figs. 3 and 13). With the pin 20ᵇ in this position, the driving connection between hand lever 20, with its sleeve 20ª, and the master switch 3ª is removed so that said lever and sleeve may be rocked freely back and forth on, and without producing any movement of, the master switch 3. In the position which the master switch 3 assumes when thus rocked in a counter clockwise direction its contact plate 78 (moved downwardly) is disengaged from contact 81, (depressed by the engagement of said plate with an insulating plug 222 on said contact, see Fig. 16) and connects contact 92 with a contact 223; while contact plate 79 is in like manner disengaged from contact 83 and connects contact 93 with a contact 224. In this position of plates 78, 79, out of engagement with the two pairs of contacts 80, 81, and 82, 83, respectively, the right and left line circuits leading from the transmitter to the distant station are broken, as are also the right and left line circuits leading to the receiver from the distant station through the two pairs of contacts 81, 92 and 83, 93, respectively, as hereinbefore described; and the transmitter of the station is connected with the receiver of that station through circuits which will presently be described. The lever 20 and its sleeve 20ª being free to be rocked on master switch 3, the paper at the transmitter may be shifted as before and the rheostats 57, 58 connected with the positive pole of battery 4 by engaging contact plate 75, carried by sleeve 20ª, with contacts 73, 74, as before. With contact plate 75 connecting contacts 73, 74, currents from the independent circuit of battery 4 are shunted through the rheostats 57, 58 of the transmitter into right and left hand main line circuits leading to the receiver of the same station. The right main line circuit consists of contact 55, arm 51, wire 84, secondary winding 85 of induction coil 85ª, wire 86, wire 225 (preferably containing a resistance 226), contact 223, contact plate 78 of the master switch, contact 92, wires 94, 94ª, contact 94ᵇ, contact 94ᶜ, wire 94ᵈ leading to right hand coil 95 of the receiving instrument, and wires 96, 97 leading thence to ground at 98 and back to battery 4. The left main line circuit consists of contact 56, arm 52, wire 88, secondary winding 89 of induction coil 85ª, wire 90, wire 227 (preferably containing a resistance 228), contact 224, plate 79 of the master switch, contact 93, wire 99 leading to relay 100, wire 101 leading thence to the left hand coil 102 of the receiver, and wires 103, 97 leading thence to ground at 98. With the two main line circuits thus established between the transmitter and the receiver of the same station, the two instruments may be tested and adjusted, the operations of transmitting and receiving the message, and shifting the paper at the transmitter and at the receiver, and of moving the receiving pen inwardly and outwardly with relation to the bottle opening 161 or surface of the strip 150 being the same as heretofore described in connection with the operation of transmitting from one station to another, as, for example, from the transmitting instrument of Fig. 1 to the receiving instrument of Fig. 2.

In Figs. 18, 19 is illustrated a modification in the locking devices for the master switch. In this case the lever 27 of the other figures of the drawing is omitted, a lever 27ª being substituted therefor which is pivoted at 27ᵇ to the casing 6, and is provided with a catch 27ᶜ adapted to engage a lug 27ᵈ on the side of hand lever 20 in each of the two positions of the latter, so as to lock the lever with its master switch 3 in each of these positions. At its forward end this lever 27ª is adapted to be engaged by one end of a U-shaped rod 27ᵉ pivoted to the under side of cover 8, the other end of said rod being engaged by button 33. On the depression of said button, rod 27ᵉ is rocked so as to swing the rear end of lever 27ᵃ upwardly, thus disengaging catch 27ᶜ from lug 27ᵈ on hand lever 20, which, with its master switch, may then be rocked forward. Button 33 being then released, lever 27ᵃ will, by its own weight, reassume its normal position with its catch 27ᶜ behind lug 27ᵈ, thus locking lever 20 and its master switch in their forward position. When lever 27ᵃ is again depressed and catch 27ᶜ withdrawn from behind lug 27ᵈ, lever 20 and connected parts are drawn rearward to normal position by spring 25, as before. As before, when a distant transmitter is connected with a station for transmitting messages to it, magnet 125 is energized by the circuit from the station battery (then acting as a local battery), and through connections, which will now be described, and which differ somewhat from the connections provided for this purpose in the preceding figures, will lock the lever 20 with its master switch in its rearward position. The means provided for this in the modified construction of Figs. 18 and 19 consists of lever 131ᵃ pivoted to the side wall of casing 6 and provided at its forward end with a hook 131ᵇ adapted to engage a pin 131ᶜ on lever 20 in the rearward position of the latter and at its rear end with the armature 131 for magnet 125. When, therefore, the magnet 125 is thus energized, the forward end of lever 131ᵃ will be rocked upwardly so as to bring its hook 131ᵇ into position for engagement with pin 131ᶜ on lever 20 and thus prevent forward movement of said lever from its rearward position.

The drawings illustrate the several features of the present invention in what is now considered to be their preferred forms, and it will be understood that modifications and changes may be made therein without departing from the spirit of the invention.

What is claimed is:—

1. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station, substantially as described.

2. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, substantially as described.

3. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, from which current is supplied, through the transmitter, to the line wires connecting it with the distant receiver, and a member movable with said switch mechanism and controlling this circuit, substantially as described.

4. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, a circuit, including a source of electric energy, from which current is supplied, through the transmitter, to the line wires connecting it with the distant receiver and with the receiver at its own station, and a member movable with said switch mechanism and controlling this circuit, substantially as described.

5. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station, and a paper shifter at the transmitter operated by said master switch mechanism, substantially as described.

6. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, from which current is supplied, through the transmitter, to the line wires connecting it with the distant receiver, a member movable with said switch mechanism and controlling this circuit, and a paper shifter at the transmitter operated by said member, substantially as described.

7. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, a circuit, including a source of electric energy, from which current is supplied, through the transmitter, to the line wires connecting it with the distant receiver and with the receiver at its own station, a member movable with said switch mechanism and controlling this circuit, and a paper shifter at the transmitter operated by said member, substantially as described.

8. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, a circuit, including a source of electric energy, from which current is supplied, through the transmitter, to the line wires connecting it with the distant receiver and with the receiver at its own station, and a member normally connected and movable with said switch mechanism but capable of being disconnected therefrom so that in the third position of the switch mechanism it may be moved relatively thereto to make and break said circuit, substantially as described.

9. The combination with the transmitting and receiving instruments of a telautograph station, of an oscillatory master switch mechanism, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, from which current is supplied, through the transmitter, to the line wires connecting it with the distant receiver and with the receiver at its own station, and a member normally connected and movable with said switch mechanism but capable of being disconnected therefrom by moving one endwise relatively to the other so that in the third position of the switch mechanism said member may be oscillated relatively thereto to make and break said circuit, substantially as described.

10. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, a circuit, including a source of electric energy, from which current is supplied, through the transmitter, to the line wires connecting it with the distant receiver and with the receiver at its own station, a member normally connected and movable with said switch mechanism but capable of being disconnected therefrom so that in the third position of the switch mechanism it may be moved relatively thereto to make and break said circuit, and a paper shifter at the transmitter operated by said member, substantially as described.

11. The combination with the transmitting and receiving instruments of a telautograph station, of an oscillatory master switch mechanism, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, from which current is supplied, through the transmitter, to the line wires connecting it with the distant receiver and with the receiver at its own station, a member normally connected and movable with said switch mechanism but capable of being disconnected therefrom by moving one endwise relatively to the other so that in the third position of the switch mechanism said member may be oscillated relatively thereto to make and break said circuit, and a paper shifter at the transmitter operated by said member, substantially as described.

12. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station, and bell or like circuits leading to and from the distant station and closable, by the home and distant operators respectively, only while the master switch mechanism is in its first named position, substantially as described.

13. The combination with the transmitter and receiver of a telautograph station, of a master switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, a circuit, including a source of electric energy, from which current is supplied, through the transmitter, to the line wires connecting it with the distant receiver and with the receiver at its own station, a member movable with said switch mechanism and controlling this circuit, and bell or like circuits leading to and from the distant station and closable, by the home and distant operators respectively, only while the master switch mechanism is in its first named position and while said circuit is not closed by said member, substantially as described.

14. The combination with the transmitter and receiver of a telautograph station, of the oscillatory master switch 3 provided with contact plates 78, 79, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, as battery 4, from which currents are supplied, through the transmitter, to the line wires connecting it with the distant receiver and with the receiver at its own station, and a lever 20 bearing a contact plate 75 controlling this circuit and having a driving connection with switch 3, said switch and lever 20 having an endwise movement, one relatively to the other, to break this connection so that each may be oscillated relatively to the other and said contact plate make and break this circuit when switch 3 is in its third named position, substantially as described.

15. The combination with the transmitter and receiver of a telautograph station, of the oscillatory master switch 3 provided with contact plates 78, 79, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, as battery 4, from which currents are supplied, through the transmitter, to the line wires connecting it with the distant receiver and with the receiver at its own station, a lever 20 bearing a contact plate 75 controlling this circuit and having a driving connection with switch 3, said switch and lever 20 having an endwise movement, one relatively to the other, to break this connection so that each may be oscillated relatively to the other and said contact plate make and break this circuit when switch 3 is in its third named position, and a paper shifter at the transmitter operated by said lever, substantially as described.

16. The combination with the transmitter and receiver of a telautograph station, of the oscillatory master switch 3 provided with contact plates 78, 79, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, as battery 4, from which currents are supplied, through the transmitter, to the line wires connecting it with the distant receiver and with the receiver at its own station, and a lever 20 bearing a contact plate 75 controlling this circuit and having a driving connection, by pin $20^b$ and slot $20^c$, with switch 3, said switch and lever 20 having an endwise movement, one relatively to the other, to break this connection so that each may be oscillated relatively to the other and said contact plate make and break this circuit when switch 3 is in its third named position, substantially as described.

17. The combination with the transmitter and receiver of a telautograph station, of the oscillatory master switch 3 provided with contact plates 78, 79, in one position of which the receiver is "on" and the transmitter "off" with relation to a distant station, and in another position of which this condition of the two instruments is reversed, while in a third position thereof both instruments are "off" with relation to the distant station, a circuit, including a source of electric energy, as battery 4, from which currents are supplied, through the transmitter, to the line wires connecting it with the distant receiver and with the receiver at its own station, a lever 20 bearing a contact plate 75 controlling this circuit and having a driving connection with switch 3, said switch and lever 20 having an endwise movement, one relatively to the other, to break this connection so that each may be oscillated relatively to the other and said contact plate make and break this circuit when switch 3 is in its third named position, and a spring normally holding them in engagement and resisting such endwise movement, substantially as described.

18. The combination with the transmitter and receiver of a telautograph station, of switch mechanism, in one position of which the receiver is "on" and the transmitter "off" with relation to a distant station, and in another position of which this condition of the two instruments is reversed, and a battery, included in a circuit controlled by said switch mechanism, and which in the first named position of the switch mechanism serves as a local battery for the receiver circuits and in the second named position of the switch mechanism serves as a line battery supplying current, through the transmitter, to the line wires leading to the distant receiver, substantially as described.

19. The combination with the transmitter and receiver of a telautograph station, of switch mechanism, in one position of which the receiver is "on" and the transmitter "off" with relation to a distant station, and in another position of which this condition of the two instruments is reversed, while in a third position thereof both instruments are "off" with relation to the distant station and "on" with relation to each other, and a battery, included in a circuit controlled by said switch mechanism, and which in the first named position of the switch mechanism serves as a local battery for the receiver circuits and in the second named position of the switch mechanism serves as a line battery supplying current, through the transmitter, to the line wires leading to the distant receiver, while in the third named position of the switch mechanism it serves both as a line battery and local battery, substantially as described.

20. The combination with the transmitter and receiver of a telautograph station, of switch mechanism, in one position of which the receiver is "on" and the transmitter "off" with relation to a distant station, a lock for said switch mechanism, and a magnet controlling said lock whereby, while current is on line from the distant station to the receiver, movement of said switch mechanism is prevented, substantially as described.

21. The combination with the transmitter and receiver of a telautograph station, of switch mechanism, in one position of which the receiver is "on" and the transmitter "off" with relation to a distant station, a lock for said switch mechanism, a magnet controlling said lock, a local circuit controlling said magnet, and a relay controlling said circuit and in turn controlled by the current on line from the distant receiver, whereby while such current is on line movement of said switch mechanism is prevented, substantially as described.

22. The combination with the transmitter and receiver of a telautograph station, of switch mechanism, in one position of which the receiver is "on" and the transmitter "off" with relation to a distant station, a normally releasable lock for said switch mechanism, and a magnet controlling said lock whereby, while current is on line from the distant station to the receiver, release of said lock is prevented, substantially as described.

23. The combination with a telautographic transmitter, of a paper shifting mechanism comprising suitable paper feeding mechanism, a manually operated rocking lever, means carried thereby for operating said feeding mechanism, a manually releasable lock for said lever, and a master switch movable with said lever and provided with means controlling the main line circuits leading from the transmitter, substantially as described.

24. The combination with a telautographic transmitter, of a paper shifting mechanism comprising suitable paper feeding mechanism, a manually operated rocking lever, means carried thereby for operating said feeding mechanism, a manually releasable lock for said lever, a circuit, including a source of electric energy, and a master switch provided with means controlling said circuit and also the main line circuits leading from the transmitter, substantially as described.

25. The combination with a receiving pen, of a main line circuit, a local circuit, devices controlled thereby and in turn controlling the making of the record by the receiving pen on its writing surface, a relay in the main line circuit, and circuit closing means controlled thereby and in turn controlling said local circuit, said circuit closing means being inclosed in an hermetically-closed receptacle and comprising a loose contact which is agitated when vibrations occur in the main line circuit, substantially as described.

26. The combination with a receiving pen, of a main line circuit, a local circuit, devices controlled thereby and in turn controlling the making of the record by the receiving pen on its writing surface, a relay in the main line circuit, and circuit closing means controlled thereby and in turn controlling said local circuit, said circuit closing means being inclosed in an hermetically-closed receptacle, from which the air has been exhausted, and comprising a loose contact which is agitated when vibrations occur in the main line circuit, substantially as described.

27. The combination with a receiving pen, of a main line circuit, a local circuit, devices controlled thereby and in turn controlling the making of the record by the receiving pen on its writing surface, a relay in the main line circuit, a diaphragm mounted on the relay and which when vibrations occur in the main line circuit is rapidly vibrated by the relay, and circuit closing means controlled by said diaphragm and in turn controlling said local circuit, said circuit closing means comprising a loose contact which is agitated when the diaphragm is thus vibrated, substantially as described.

28. The combination with a receiving pen, of a main line circuit, a local circuit, devices controlled thereby and in turn controlling the making of the record by the receiving pen on its writing surface, a relay in the main line circuit, a diaphragm mounted on the relay and which when vibrations occur in the main line circuit is rapidly vibrated by the relay, and circuit closing means carried by said diaphragm and in turn controlling said local circuit, said circuit closing means comprising a loose contact which is agitated when the diaphragm is thus vibrated, substantially as described.

29. The combination with a receiving pen, of a main line circuit, a local circuit, devices controlled thereby and in turn controlling the making of the record by the receiving pen on its writing surface, a relay in the main line circuit, a diaphragm mounted on the relay and which when vibrations occur in the main line circuit is rapidly vibrated by the relay, and circuit closing means carried by said diaphragm and in turn controlling said local circuit, said circuit closing means being inclosed in an hermetically-closed receptacle and comprising a loose contact which is agitated when the diaphragm is thus vibrated, substantially as described.

30. The combination with a receiving pen, of a main line circuit, a local circuit, devices controlled thereby and in turn controlling the making of the record by the receiving pen on its writing surface, a relay in the main line circuit, a diaphragm mounted on the relay and which when vibrations occur in the main line circuit is rapidly vibrated by the relay, and circuit closing means carried by said diaphragm and in turn controlling said local circuit, said circuit closing means being inclosed in an hermetically-closed receptacle, from which the air has been exhausted, and comprising a loose contact which is agitated when the diaphragm is thus vibrated, substantially as described.

31. The combination with a receiving pen, a main line circuit and devices, including a movable coil, controlled thereby and in turn controlling the lateral movements of the receiving pen over its writing surface, of a relay in the main line circuit, a local circuit controlled by the relay and in turn controlling the movements of parts of the receiver, a shunt circuit interposed in the main line circuit between the relay and said coil by which the current first passing over said main line circuit is shunted to ground around the coil, and circuit closing means therefor controlled by the local circuit whereby when the relay is energized by the current and the local circuit controlled thereby is closed the shunt circuit is opened and the current then passed through the coil, substantially as described.

32. The combination with a receiving pen, a main line circuit and devices, including a movable coil, controlled thereby and in turn controlling the lateral movements of the receiving pen over its writing surface, of a relay in the main line circuit, a local circuit controlled by the relay and in turn controlling the movements of parts of the receiver, a shunt circuit interposed in the main line circuit between the relay and said coil by which the current first passing over said main line circuit is shunted to ground around the coil, and circuit closing means therefor operated by one of the receiver parts whose movements are thus controlled by the local circuit whereby when the relay is energized by the current and the local circuit controlled thereby is closed the shunt circuit is opened and the current then passed through the coil, substantially as described.

33. The combination with a receiving pen, a main line circuit and devices, including a movable coil, controlled thereby and in turn controlling the lateral movements of the receiving pen over its writing surface, of a relay in the main line circuit, a local circuit controlled by the relay, a paper shifter magnet controlled by said local circuit, a shunt circuit interposed in the main line circuit between the relay and said coil by which the current first passing over said main line circuit is shunted to ground around the coil, and circuit closing means therefor controlled by the paper shifter magnet, whereby when the relay is energized by the current and the local circuit controlled thereby is closed the shunt circuit is opened and the current passed through the coil, substantially as described.

34. The combination with a receiving pen, two main line circuits and devices, including a movable coil in each circuit, controlled thereby and in turn controlling the lateral movements of the receiving pen over its writing surface, of a relay in one main line circuit, a local circuit controlled by the relay, a bell or the like, a shunt circuit therefor from the other main line circuit, and circuit closing means for said shunt circuit controlled by said local circuit, whereby when the relay is energized and said local circuit is thereby closed, said shunt circuit is opened, substantially as described.

35. The combination with a receiving pen, two main line circuits and devices, including a movable coil in each circuit, controlled thereby and in turn controlling the lateral movements of the receiving pen over its writing surface, of a relay in one main line circuit, a local circuit controlled by the relay and in turn controlling the movements of parts of the receiver, a bell or the like, a shunt circuit therefor from the other main line circuit, and circuit closing means for said shunt circuit operated by one of the receiver parts whose movements are thus controlled by said local circuit, whereby when the relay is energized and said local circuit is thereby closed, said shunt circuit is opened, substantially as described.

36. The combination with a receiving pen, two main line circuits and devices, including a movable coil in each circuit, controlled thereby and in turn controlling the lateral movements of the receiving pen over its writing surface, of a relay in one main line circuit, a local circuit controlled by the relay, a paper shifter magnet controlled by said local circuit, a bell or the like, a shunt circuit therefor from the other main line circuit, and circuit closing means for said shunt circuit controlled by said paper shifter magnet, whereby when the relay is energized and said local circuit is thereby closed, said shunt circuit is opened, substantially as described.

37. The combination with a receiving pen, two main line circuits and devices, including a movable coil in each circuit, controlled thereby and in turn controlling the lateral movements of the receiving pen over its writing surface, of a relay in one main line circuit, a local circuit controlled thereby and in turn controlling the movements of parts of the receiver, a shunt circuit interposed in said main line circuit between the relay and said coil by which the current first passing over said main line circuit is shunted to ground around its coil, a like shunt circuit from the other main line circuit around its coil to ground, and circuit closing means for said shunt circuits controlled by said local circuit whereby when said relay is energized and said local circuit controlled thereby is closed both shunt circuits are opened and the current passed through the coils, substantially as described.

38. The combination with a receiving pen, two main line circuits and devices, including a movable coil in each circuit, controlled thereby and in turn controlling the lateral movements of the receiving pen over its writing surface, of a relay in one main line circuit, a local circuit controlled thereby and in turn controlling the movements of parts of the receiver, a shunt circuit interposed in said main line circuit between the relay and said coil by which the current first passing over said main line circuit is shunted to ground around its coil, a like shunt circuit from the other main line circuit around its coil to ground, a bell or the like in the latter shunt circuit, and circuit closing means for said shunt circuits controlled by said local circuit whereby when said relay is energized and said local circuit controlled thereby is closed both shunt circuits are opened and the current passed through the coils, substantially as described.

39. The combination with a receiving pen, two main line circuits and devices, including a movable coil in each circuit, controlled thereby and in turn controlling the lateral movements of the receiving pen over its writing surface, of a relay in one main line circuit, a local circuit controlled thereby and in turn controlling the movements of parts of the receiver, a shunt circuit interposed in said main line circuit between the relay and said coil by which the current first passing over said main line circuit is shunted to ground around its coil, a like shunt circuit from the other main line circuit around its coil to ground, and circuit closing means for said shunt circuits operated by one of the receiver parts whose movements are thus controlled by said local circuit whereby when said relay is energized and said local circuit controlled thereby is closed both shunt circuits are opened and the current passed through the coils, substantially as described.

40. The combination with a receiving pen, two main line circuits and devices, including a movable coil in each circuit, controlled thereby and in turn controlling the lateral movements of the receiving pen over its writing surface, of a relay in one main line circuit, a local circuit controlled thereby, a paper shifter magnet controlled by said local circuit, a shunt circuit interposed in said main line circuit between the relay and said coil by which the current first passing over said main line circuit is shunted to ground around its coil, a like shunt circuit from the other main line circuit around its coil to ground, and circuit closing means for said shunt circuits controlled by the paper shifter magnet, whereby when said relay is energized and said local circuit controlled thereby is closed both shunt circuits are opened and the current passed through the coils, substantially as described.

41. The combination with a receiving pen, two main line circuits, a pair of movable coils and connections for controlling the movements of the pen, and a suitable field magnet for said coils, of a local circuit for said magnet, a relay in one of the main line circuits, a circuit closer controlled thereby and in turn controlling said local circuit, and a short circuit connected with the field magnet at a point near its discharge end, and which is closed when the local circuit is opened, for short circuiting a portion of the magnet winding and limiting its rate of discharge, substantially as described.

42. The combination with a receiving pen, two main line circuits, a pair of movable coils and connections for controlling the movements of the pen, and a suitable field magnet for said coils, of a local circuit for said magnet, a relay in one of the main line circuits, a circuit closer controlled thereby and in turn controlling said local circuit, and a short circuit, including said circuit closer, connected with the field magnet at a point near its discharge end, and which is closed when the local circuit is opened, for short circuiting a portion of the magnet winding and limiting its rate of discharge, substantially as described.

43. The combination with a receiving pen, two main line circuits, a pair of movable coils and connections for controlling the movements of the pen, and a suitable field magnet for said coils, of a local circuit for said magnet, a relay in one of the main line circuits, a circuit closer controlled thereby and in turn controlling said local circuit, and a short circuit, including the armature of said relay and said circuit closer, connected with the field magnet at a point near its discharge end, and which is closed when the local circuit is opened, for short circuiting a portion of the magnet winding and limiting its rate of discharge, substantially as described.

44. The combination with a receiving pen, two main line circuits, a pair of movable coils and connections for controlling the movements of the pen, and a suitable field magnet for said coils, of a local circuit for said magnet, a relay in one of the main line circuits, a circuit closer controlled thereby and in turn controlling said local circuit, and a short circuit, including the armature of said relay and said circuit closer, connected with the field magnet at a point near its discharge end, and which is closed when the local circuit is opened, for short circuiting a portion of the magnet winding and limiting its rate of discharge, said armature and circuit closer being so related that when the armature is retracted it will contact with the circuit closer and when it is attracted by the relay, to cause said circuit closer to close the local circuit, will break contact with said circuit closer, substantially as described.

45. The combination with a receiving pen, of a vertically movable coil for controlling the lateral movements thereof over its writing surface, and a field magnet the core of which is inclosed by said coil, said coil and core having interposed between them suitable fenders, as 107ª, substantially as described.

46. The combination with the arm or arms of a receiving pen and means for controlling the lateral movements of the pen over its writing surface, of a pen lifter magnet and connections for controlling the movements of the pen to and from its writing surface, including a pen rest and an armature for moving it which is movable across the poles of the magnet whereby the pull of the magnet thereon is at its maximum at the start, substantially as described.

47. The combination with the arm or arms of a receiving pen and means for controlling the lateral movements of the pen over its writing surface, of a magnet the armature of which controls the movements of the pen to and from its writing surface, one of said pen arms being provided with a hook or projection and said armature with means coacting therewith to limit the movement of the pen in an upward direction relatively to the field of writing, substantially as described.

48. The combination with the arm or arms of a receiving pen and means for controlling the lateral movements of the pen over its writing surface, of a magnet the armature of which is provided with a pen rest controlling the movements of the pen to and from its writing surface, one of said pen arms being provided with a hook or projection adapted to coact with said pen rest to limit the movement of the pen in an upward direction relatively to the field of writing, substantially as described.

49. The combination with a receiving pen, a main line circuit, a vertically movable coil in said circuit, controlling the lateral movements of the pen over its writing surface, and a suitable magnetic field for said coil, of means for suspending the coil in said field comprising a spring and a support therefor on which it is adjustably mounted, substantially as described.

50. The combination with a receiving pen, a main line circuit, a vertically movable coil in said circuit, controlling the lateral movements of the pen over its writing surface, and a suitable magnetic field for said coil, of means for suspending the coil in said field comprising a suitable support, an adjustable arm thereon and a spring adjustably mounted in said arm, substantially as described.

51. The combination with a telautographic receiving pen, of pivotally connected and pivotally mounted supporting arms therefor, stops pivotally mounted on suitable supports and engaging said arms for holding them and the pen in unison or normal position, and means engaging said stops and their supports for adjusting said stops, substantially as described.

52. The combination with a telautographic receiver, provided with a fixed part for sidewise engagement with an ink bottle, of a bottle holder having a part for sidewise engagement with the bottle in opposition to said fixed bottle-engaging part of the receiver, and a fastening device for said holder which when loosened permits the withdrawal or introduction of a bottle and when tightened causes the bottle to be tightly clamped between the holder and the fixed bottle-engaging part of the receiver, substantially as described.

53. The combination with a telautographic receiver provided with a fixed part for engagement with the corner of an ink bottle, of a bottle holder having a part for sidewise engagement with the bottle in opposition to said fixed bottle-engaging part of the receiver, and a fastening device for said holder which when loosened permits the withdrawal or introduction of a bottle and when tightened causes the bottle to be tightly clamped between the holder and the fixed bottle-engaging part of the receiver, substantially as described.

54. The combination with a telautographic receiver, provided with a fixed part for sidewise engagement with an ink bottle, of a bottle holder having a part for sidewise engagement with the bottle in opposition to said fixed bottle-engaging part of the receiver, and a fastening device for said holder which when loosened permits tilting of the holder and therefore withdrawal or introduction of a bottle and when tightened causes the bottle to be tightly clamped between the holder and the fixed bottle-engaging part of the receiver, substantially as described.

55. The combination with a telautographic receiver, of a paper shifting mechanism comprising a magnet, a circuit for energizing the same, means, controlled by the line current to the receiver, for making and breaking this circuit, a swinging armature for said magnet having a part for engaging one surface of the paper, and another swinging part moved with the armature for engaging the other surface of the paper, substantially as described.

56. The combination with a telautographic receiver, of a paper shifting mechanism comprising a magnet, a circuit for energizing the same, means, controlled by the line current to the receiver, for making and breaking this circuit, a swinging armature for said magnet having a part for engaging one surface of the paper, and another swinging part moved by and with the armature for engaging the other surface of the paper, substantially as described.

57. The combination with a telautographic receiver having a vertically disposed writing field, a vertically swinging paper shifting mechanism and means controlled by the line current to the receiver for operating the same, of a guiding chute, as 155, into which the paper is delivered by such shifting mechanism, said chute being located above the field of writing of the receiver and said paper shifting mechanism being located beneath but in close proximity to the lower end of said chute so as to force the paper upwardly therethrough, substantially as described.

58. The combination with a telautographic receiver having a vertically disposed writing field, a vertically swinging paper shifting mechanism and means controlled by the line current to the receiver for operating the same, of a guiding chute, as 155, into which the paper is delivered by such shifting mechanism, said guide having a serrated edge at its opposite end, said chute being located above the field of writing of the receiver and said paper shifting mechanism being located beneath but in close proximity to the lower end of said chute so as to force the paper upwardly therethrough, substantially as described.

In testimony whereof, I have hereunto set my hand, in the presence of two subscribing witnesses.

GEORGE S. TIFFANY.

Witnesses:
 J. A. GRAVES,
 T. F. KEHOE.